United States Patent
Harte et al.

(10) Patent No.: US 11,363,825 B2
(45) Date of Patent: Jun. 21, 2022

(54) STABILIZATION OF CARRAGEENAN FREE CHOCOLATE MILK

(71) Applicant: The Penn State Research Foundation, University Park, PA (US)

(72) Inventors: Federico Miguel Harte, Port Matilda, PA (US); Michelle Tran, Winnipeg (CA); John Coupland, State College, PA (US); Robert Roberts, State College, PA (US); Greg Ziegler, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 173 days.

(21) Appl. No.: 16/295,749

(22) Filed: Mar. 7, 2019

(65) Prior Publication Data

US 2019/0274331 A1    Sep. 12, 2019

Related U.S. Application Data

(60) Provisional application No. 62/639,771, filed on Mar. 7, 2018.

(51) Int. Cl.
*A23G 1/56* (2006.01)
*A23G 1/46* (2006.01)

(52) U.S. Cl.
CPC .............. *A23G 1/56* (2013.01); *A23G 1/46* (2013.01); *A23V 2002/00* (2013.01); *A23V 2250/54246* (2013.01); *A23V 2250/60* (2013.01); *A23V 2300/24* (2013.01); *A23V 2300/26* (2013.01)

(58) Field of Classification Search
CPC ........ A23G 1/56; A23G 1/46; A23V 2002/00; A23V 2250/54246; A23V 2250/60; A23V 2300/24; A23V 2300/26

USPC ......................................... 426/580, 584, 519
See application file for complete search history.

(56) References Cited

U.S. PATENT DOCUMENTS

| | | | | | |
|---|---|---|---|---|---|
| 1,849,030 | A | * | 3/1932 | Zern .................... | A23G 1/56 426/584 |
| 3,615,659 | A | * | 10/1971 | Weber .................. | A23G 1/56 426/584 |
| 5,290,582 | A | * | 3/1994 | Dressel ................ | A23C 9/1512 426/521 |
| 2016/0374359 | A1 | * | 12/2016 | Harte .................... | A23C 9/1524 426/580 |

* cited by examiner

*Primary Examiner* — Leslie A Wong
(74) *Attorney, Agent, or Firm* — Hodgson Russ LLP

(57) ABSTRACT

Compositions and methods that relate to improved chocolate milk are provided. The chocolate milk may be shelf stable and k-carrageenan free. The chocolate milk does not undergo visually detectable phase separation for at least 7 days. The chocolate milk that does not undergo the visually detectable phase separation contains from 1%-10% micellar casein w/v. Methods for preparing shelf stable k-carrageenan free chocolate milk are also provided and include mixing cocoa powder, sugar, milk, and micellar casein to obtain a mixture, and optionally heating and homogenizing the mixture, and subsequently subjecting the mixture to High Pressure Jet Processing (HPJ) or high pressure homogenization of at least 300 MPa, thereby producing the shelf table k-carrageenan free chocolate milk. The shelf stable k-carrageenan free chocolate milk of produced using such a method may be refrigerated temperature for at least 14 days, and does not undergo detectable phase separation for at least 14 days.

7 Claims, 19 Drawing Sheets

(17 of 19 Drawing Sheet(s) Filed in Color)

STABILIZATION OF CARRAGEENAN FREE CHOCOLATE MILK

CROSS REFERENCE TO RELATED APPLICATIONS

This application claims the benefit of U.S. provisional patent application No. 62/639,771, filed Mar. 7, 2018, the disclosure of which is incorporated herein by reference.

STATEMENT REGARDING FEDERALLY SPONSORED RESEARCH

This invention was made with government support under Hatch Act Project no. PEN04565, awarded by the United States Department of Agriculture/NIFA. The government has certain rights in the invention.

BACKGROUND OF THE DISCLOSURE

The addition of κ-carrageenan is effective in stabilizing dairy-based dispersions (e.g., ice cream, chocolate milk). However, carrageenan as a food ingredient has been under scrutiny over the past 80 years due to potential adverse health effects associated with the consumption of carrageenan and its derivatives (Bixler, 1996; Cohen and Ito, 2002; Shah and Huffman, 2003). Due to the lack of consensus within the scientific community and controversy by consumers, the United States Department of Agriculture (USDA) National Organic Standard Board (NOSB) voted to sunset carrageenan from all organic food products (USDA-NOSB, 2016a; b). Although the decision must be adopted by the USDA in order to take effect, the ban has major implications on food processors that utilize carrageenan as their main stabilizer in chocolate milk.

The questioning of the use of carrageenan in organic foods is also driven by expanding 'clean label' demands by consumers. Consumers are becoming more health conscious of their food and are more likely to read food labels and look for foods with minimal processing, and fewer and more familiar ingredients (Innova Market Insights, 2015). To meet the demands by consumers, food scientists continue to investigate alternative ingredients and processing technologies to replace unfamiliar stabilizers and dietary emulsifiers, including carrageenan, but the remains a need for improved compositions and methods for use in organic foods including but not necessarily limited to chocolate milk. The present disclosure is pertinent to these needs.

SUMMARY OF THE DISCLOSURE

The present disclosure provides compositions and methods that relate to improved chocolate milk. In one aspect, the disclosure provides shelf stable chocolate milk. In an embodiments, the chocolate milk is free of k-carrageenan. In embodiments, the chocolate milk does not undergo visually detectable phase separation for at least 7 days, or undergoes visually detectable phase separation that is less than a reference value for at least 7 days, such a period being extendable to 14 days, or longer. Methods for determining visually detectable phase separation are described further below. In certain embodiments, the chocolate milk that does not undergo the visually detectable phase separation comprises from 1-10% micellar casein. In an embodiment, said milk comprises 1%-4% micellar casein w/v. In certain embodiments, the milk component of the compositions is skim milk. Thus, the disclosure includes the described chocolate milk that contains any of 1, 2, 3, 4, 5, 6, 7, 8, 9, or 10% micellar casein w/v.

In another aspect, methods for preparing shelf stable k-carrageenan free chocolate milk are provided. In one approach, a method of the disclosure comprises mixing cocoa powder, sugar, milk, and micellar casein to obtain a mixture thereof, optionally heating and homogenizing the mixture, and subsequently subjecting the mixture to High Pressure Jet Processing (HPJ), wherein the HPJ comprises a hydrostatic pressure of at least 300 MPa, thereby producing the shelf table k-carrageenan free chocolate milk. In one implementation, the hydrostatic pressure comprises between 300 MPa and 700 MPa. In embodiments, said pressure comprises between 375 MPa and 500 MPa. In certain embodiments, micellar casein is added such that it is from 1-10% w/v of the shelf stable k-carrageenan free chocolate milk. In certain embodiments, shelf stable k-carrageenan free chocolate milk of this disclosure is refrigerated temperature for at least 14 days, and does not undergo detectable phase separation for at least 14 days, or does not exhibit visually detectable phase separation that is less than a reference value for at least 14 days.

BRIEF DESCRIPTION OF THE DRAWINGS

This patent or application file contains at least one drawing executed in color. Copies of this patent or patent application publication with color drawing(s) will be provided by the Office upon request and payment of the necessary fee, FIG. 1. Milk bottle used for storing chocolate milk samples. Red arrows indicate the top and bottom phases used for the quantification of phase separation, dry weight, fat content, protein content, SDS-PAGE (A). Lightness (L*) over 14 day shelf-life stored at 4° C. was measured by placing the colorimeter in the area indicted by the red circle (B).

DESCRIPTION OF THE DISCLOSURE

Figure 1:
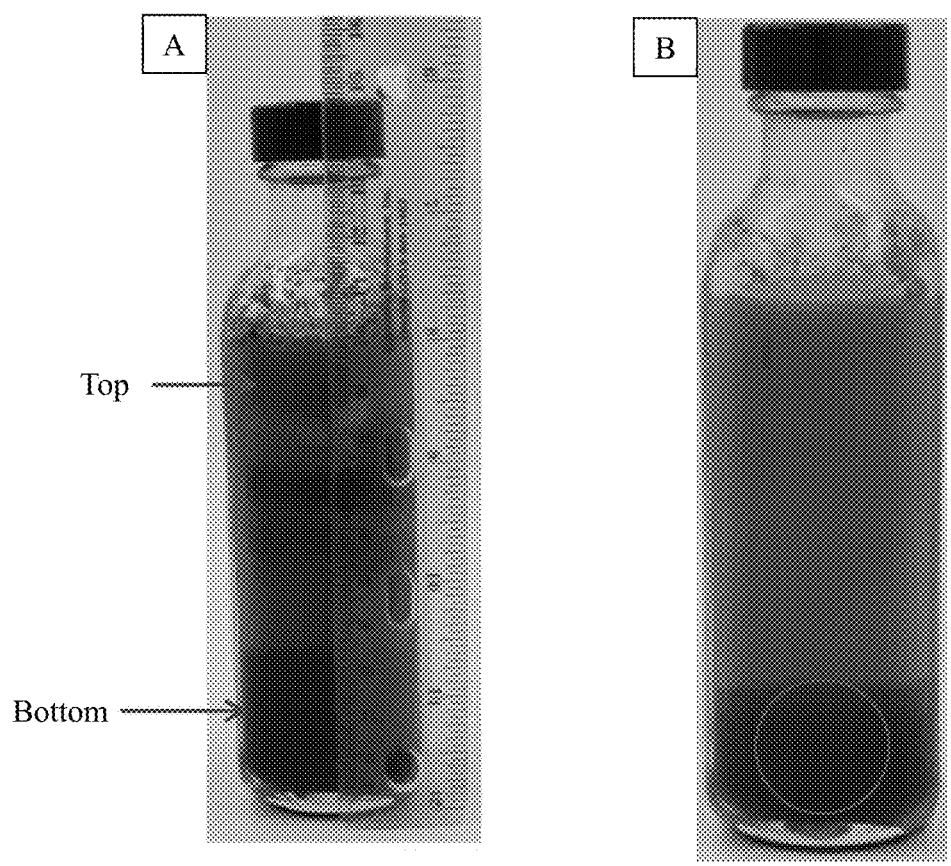

All numeric ranges disclosed herein include their upper and lower limits, all numbers between the upper and lower limits, and all ranges between the upper and lower limits The present disclosure relates to dairy products that contain milk, wherein the milk products are k-carrageenan free. In embodiments, the disclosure relates to k-carrageenan-free chocolate milk. In certain examples the disclosure provides k-carrageenan-free chocolate milk that exhibits reduced, low, or no phase separation during its shelf life. In embodiments the disclosure provides k-carrageenan-free chocolate milk comprising added micellar casein, as described further below.

Embodiments of this disclosure are illustrated using High Pressure jet (HPJ) processing. As will be described in more detail below, HPJ equipment utilizes a nozzle with orifice <0.35 mm, in contrast to typical HPH processors which utilize a needle- or ball-seat valve (Tobin et al., 2015; Harte, 2016). The HPJ is equipped with an attenuator to stabilize pressure and prevent "low pressure valleys" during processing. Devices and methods for use in HJP processing are described in, for example, U.S. patent application Ser. No. 15/185,296, published as U.S. patent publication no. 20160374359, from which the disclosure of HJP devices and device components, methods of HJP processing, and all description milk and foam properties and foam and milk analysis, is incorporated herein by reference.

The present disclosure includes but is not limited to analysis of HPJ-induced dissociation of casein micelles and its effects on casein-cocoa interactions. The disclosure provides non-limiting demonstrations that HPJ-processing with micellar casein addition improves cocoa stability in carrageenan-free chocolate skim milk. Based on the data discussed herein, it is apparent that the fortification of skim milk with micellar casein, together with HPJ processing in chocolate skim milk, is applicable to cocoa stability throughout the shelf life of chocolate milk.

The present disclosure encompasses all attributes of chocolate milk and the steps of making it as described herein, including but not limited to measurements and expressions thereof, all values for k-carrageenan, casein, micellar casein, cocoa (regardless of form), milk, skim milk, sugar, corn starch, proteins, etc., fat, milk fat, and all pressure, velocity, time and temperature values, device parameters, all homogenization values, all equations and mathematical alternatives to and variations thereof, all milk characteristics, including but not limited to color, taste, organoleptic properties, clarity, rheological properties, viscosity, flow properties, phase separations, sedimentation, aggregation, amounts of solids, visual stabilities, properties of suspensions, particle sizes, microscopy-based properties, casein-casein and casein-cocoa network properties, and cocoa-casein aggregates. In embodiments, the disclosure relates to chocolate milk that has been produced using HPJ and temperature treatments as described herein. In embodiments, the chocolate milk comprises added micellar casein of more than 1% w/v. In embodiments, the chocolate milk comprises added micellar casein of at least 2, 4, 5, 6, 7, 8, 9, or 10% w/v. In embodiments, the micellar casein is 4%, or is at least 4% w/v. In embodiments the chocolate milk is produced using a process that includes HPJ treatment at >300 MPa. In embodiments, the process comprises using from 300-700 MPA HPJ treatment. In embodiments, 300-500 MPa of hydrostatic pressure is used.

In particular embodiments, the present disclosure includes the unexpected discovery that a reduction in k-carrageenan-free chocolate milk stability occurs when micellar casein is added to 1% and 2% w/v after which the chocolate milk is processed using HPJ at 500 MPa, vs. k-carrageenan-free chocolate skim milk without added casein processed using HPJ at 500 MPa. Further, adding 1% and 2% micellar casein did not have a positive effect when k-carrageenan-free chocolate milk was processed at pressures <375 MPa. However, by adding 4% micellar casein and treating with HJP at 375 and 500 MPa, no detectable phase separation was observed after 14 days. Thus, the disclosure provides in various embodiments k-carrageenan-free chocolate milk comprising about 3-4% micellar casein, wherein the k-carrageenan-free chocolate milk has been subjected to an HJP process subsequent to the addition of the micellar casein, and wherein the chocolate milk exhibits phase stability (i.e., no visually detectable phase separation) for a period of time after the HJP processing, including a period of up to or at least 14 days. In embodiments, the chocolate milk contains only trace amounts of k-carrageenan.

In embodiments the present disclosure comprises: subjecting k-carrageenan-free chocolate milk to HJP as described herein, wherein subsequent to the HJP the chocolate milk exhibits equal or greater phase stability relative to a suitable reference. In embodiments the reference comprises a parameter, such as phase stability, obtained from analysis of chocolate milk that contains k-carrageenan.

In embodiments, determining phase separation comprises visual determination of phase separation of k-carrageenan-free chocolate milk components. In an embodiment visual determination of phase separation is performed using the formula:

$$\text{Phase separation (\%)} = \left(1 - \frac{\text{Height of bottom phase (cm)}}{\text{Height of chocolate milk volume in bottle (cm)}}\right) \times 100 \quad [1]$$

In embodiments, k-carrageenan-free chocolate milk processed according to the present disclosure exhibits no more phase separation that chocolate milk that comprises k-carrageenan. In embodiments, k-carrageenan-free chocolate milk processed according to the present disclosure exhibits lack of visually detectable phase separation for a shelf period of at least 2, 3, 4, 5, 6, 7, 8, 9, 10, 11, 12, 13 or 14 days, and up to 25 days. In embodiments, phase separation is measured by spectrophotometric methods, light scattering, conductivity, or sonic velocity. In embodiments, chocolate milk used in aspects of the invention is pasteurized or ultra-pasteurized. In embodiments, the chocolate milk can be refrigerated for a period of time, such as up to 25 days, or is commercially sterile and kept at room temperature.

In embodiments, the method comprises processing chocolate milk using HPJ. There are a variety of HPJ processes and devices known and commercially available (commonly known as "WaterJets"), each of which can be adapted for use with the present disclosure, and each of which includes use of high pressure that results in reduction of heterogeneity (i.e., "homogenization") of the processed milk and/or a component(s) of the milk. In embodiments a k-carrageenan-free chocolate milk of this disclosure may be subjected to heat treatment, and may be conventionally homogenized, in addition to the HJP processing described herein.

In embodiments, the HJP comprises exposing the chocolate milk to at least 375 MPa pressure. In embodiments the disclosure comprises adding micellar casein to the chocolate milk before the HJP processing. In embodiments the pressure comprises from 375-500 MPa. In embodiments, the micellar casein is added in an amount of more than 1%, more than 2%, more than 3%, or at least 4% w/v.

In more detail, in embodiments, the HPJ comprise exposing chocolate milk to HPJ using up to 800 MPa of pressure and flow rate from 0.1 to 1000 L/min. In embodiments, the HPJ comprises exposing chocolate milk to at between 100-600 MPa. In embodiments, the HPJ comprises exposing chocolate milk to at least 200 MPa pressure. In embodiments, the HPJ comprises stepwise changes in pressure, such as increasing or decreasing pressure from 10-100 MPa increments over a period of time, and temperature between 1 and 100° C. In embodiments, the disclosure includes using at least 200-800 MPa pressure, inclusive, and including all integers and ranges of integers there between. In embodiments, the disclosure includes using at least 400, 500, 600, 700, and up to 800 MPa pressure. In certain embodiments, the disclosure includes at least 400 MPa.

As discussed herein, the disclosure includes addition of casein to chocolate milk. In embodiments, micellar casein, caseinate, milk protein concentrate, or milk protein isolates are used to stabilize milk chocolate of this disclosure. In embodiments, micellar casein is used, such as in the form of casein micelles. Thus, casein molecules that are colloidally suspended in an aqueous component of milk are encompassed by the disclosure. In embodiments, casein micelles are added to milk, or casein is added such that casein micelles are formed.

Casein micelles are known in the art. They are protein quaternary structure formed mainly by casein proteins with diameters ranging from 10 to 500 nm. Reformed micelles are newly formed protein aggregates (diameter ranging from 10 nm to 5000 nm) that are formed from single casein proteins due to processing operations. Casein micelles are commercially available and commercially available formulations can be used in embodiments of this disclosure.

In embodiments the method comprises performing HPJ using waterjet technologies. Thus, in general, the chocolate milk is subjected to a high pressure treatment in part by using any of a variety of pumps, including but not necessarily limited to any positive displacement pump, piston pump, plunger pump, pneumatic pump, ceramic intensifier pump, and the like, which forces the milk through a means for flow restriction using a ceramic, diamond, sapphire, or ruby nozzle. Forcing the milk through the flow restriction component results in increased hydrostatic pressure and a variety of forces acting on the milk, including but not necessarily limited to turbulence, shear forces, thermal forces, impingement, and cavitation. Without intending to be bound by any particular theory, it is considered that some or all of these forces work to improve the milk-derived products produces according to the current disclosure.

In embodiments, the chocolate milk processed according to the invention is whole milk, or low fat milk, or skim milk. As is known in the art, the fat content of milk is the proportion of milk by weight made up by butterfat, also referred to as milk fat. The fatty acids of butterfat comprise, by mass fraction, saturated and unsaturated fatty acids. The saturated fatty acids comprise: Palmitic acid: 31%, Myristic acid: 12%, Stearic acid: 11%; Lower (at most 12 carbon atoms) saturated fatty acids: 11%; pentadecanoic acid and heptadecanoic acid: traces. Unsaturated fatty acids comprise: Oleic acid: 24%; Palmitoleic acid: 4%; Linoleic acid: 3%; and alpha-Linolenic acid: 1%. Skim milk contains less than 0.5% butterfat, typically 0.1%. Lowfat milk contains between 0.5-2% butterfat, and includes 1% and 2% varieties. Whole milk contains at least 3.25% fat. In embodiments, milk used in embodiments of this disclosure comprises low fat, skim milk, or whole milk.

In embodiments the disclosure includes a container that contains a k-carrageenan-free chocolate milk product made according to this disclosure, wherein the container comprises printed material, the printed material identifying the contents of the container as at least one of: being k-carrageenan-free, having the only ingredients as milk, milk components and chocolate, or as a certified organic product. Thus, in embodiments, the printed material may be provide as a label, which may be a so-called clean label.

The following examples are meant to illustrate but not limit the invention.

Materials and Methods Example (common to Example 1 and Example 2 below)

Chocolate Skim Milk Processing

Pasteurized skim milk was purchased from the Penn State Berkey Creamery. Micellar casein was supplied by Glanbia, commercial-grade alkalized cocoa powder was supplied by Cargill (Minneapolis, Minn.), carrageenan (Ticaloid® 770 MB) by TIC Gums (White Marsh, Md.), and corn starch (Thermflo) by Ingredion Incorporated (Westchester, Ill.).

Chocolate skim milk was prepared by adding alkalized cocoa powder (1.5%), cane sugar (6%), and carrageenan (0% or 0.05%) to pasteurized skim milk. Prepared chocolate milk samples and controls were heated to 85-92° C. for 10 min to activate carrageenan and conventionally homogenized ($1^{st}$ stage: 14 MPa; $2^{nd}$ stage: 3 MPa; Gaulin Type 80 M3) prior to HPJ-processing. Additionally, a control formulation with corn starch (CS) was created with an apparent viscosity within the range of commercial chocolate milk beverages (ca. 5-12 mPa s) and held at 25° C. (Yanes et al., 2002). Water and cocoa (1.5% w/v) dispersions were also formulated as controls to determine HPJ-processing effects on cocoa particles.

Additional experiments were conducted where 1%, 2%, or 4% w/v of micellar casein was added to chocolate skim milk prior to HPJ processing. Chocolate skim milk with different concentrations of micellar casein was heated to 85-92° C. and conventionally homogenized ($1^{st}$ stage: 14 MPa; $2^{nd}$ stage: 3 MPa) prior to HPJ-processing. Table 1 shows all compositions of HPJ-processed chocolate skim milk.

TABLE 1

Percent basis composition Chocolate Skim Milk and Chocolate Skim Milk with Micellar Casein (% w/v)

| Ingredients | Control-k | Control-CS | Control-ACP | SM | MC + 1% | MC + 2% | MC + 4% |
|---|---|---|---|---|---|---|---|
| Skim Milk | 92.45 | 92.00 | — | 92.50 | 91.50 | 90.50 | 88.50 |
| Sugar | 6.00 | 6.00 | — | 6.00 | 6.00 | 6.00 | 6.00 |
| ACP | 1.50 | 1.50 | 1.50 | 1.50 | 1.50 | 1.50 | 1.50 |
| Carrageenan | 0.05 | — | — | — | — | — | — |
| Corn Starch | — | 0.50 | — | — | — | — | — |
| Micellar Casein | — | — | — | — | 1.00 | 2.00 | 4.00 |
| Water | — | — | 98.50 | — | — | — | — |

Control-k Control sample containing k-carrageenan
Control-CS Control sample containing corn starch to match the viscosity of typical commercial chocolate milks (µ = 5 mPa · s)
Control-ACP Control sample containing Alkalized Cocoa Powder in water
SM Skim milk, samples containing skim milk, sugar, and cocoa only
MC Micellar Casein, samples containing 1, 2, 4% w/v micellar casein
ACP Alkalized Cocoa Powder High Pressure Jet Processing of Chocolate Skim Milk Heated and conventionally homogenized chocolate milks were subjected to HPJ-processing pressures from 125 to 500 MPa in 125 increments using a Hyperjet 94i-S pump system (Flow International Corporation, Kent, Wash.). An intensifier pump was used to maintain high pressure and the milk was sprayed through a 10 µm pore size diamond nozzle. A custom-made tubular heat exchanger (outer tube diameter of 7.6 cm and inner tube diameter 5.1 cm, with a height of 122 cm) connected to a temperature-controlled water bath was placed before the nozzle and was used to maintain temperature of the milk at 55° C. or 5° C. before the nozzle. A second heat exchanger (outer tube diameter of 7.6 cm and inner tube diameter 5.7 cm, with a height of 152.4 cm) was placed after the nozzle to contain and cool the HPJ sprayed milk. "Sweet water" (water cooled to 4° C.) provided by the Penn State Department of Food Science pilot plant was pumped through the second heat exchanger. The temperature of all samples was recorded immediately after processing.

Four control samples were created:
Control+: chocolate milk with carrageen and no HPJ processing;
Control-0 MPa: chocolate milk without carrageenan and no HPJ processing
Control-CS: chocolate milk with added corn starch to reach apparent viscosity levels similar to commercial chocolate milk but with no HPJ processing
Control-ACP: cocoa dispersed in water (1.5% w/v) and processed using HPJ at 500 MPa.

Water and cocoa (1.5% w/v) dispersions were mixed and stored at 4° C., then heated to 85-95° C., conventionally homogenized, and then HPJ-processed. Additional experiments were conducted with skim milk fortified with micellar casein (MC, 1%, 2%, or 4% w/v) and HPJ processed from 125 to 500 MPa in 125 MPa increments. Samples with additional MC processed at 125 to 375 MPa were only monitored for visual stability.

Phase Separation and Lightness (L*)

The stability of HPJ-processed chocolate milk and controls was monitored over 14 days. The samples were stored at 4° C. and analyzed on Day 0, 1, 3, 5, 10, and 14 for phase separation and lightness. The HPJ-processed chocolate milk, Control+, and Control-CS samples were stored in narrow mouth milk dilution bottles and filled to a height of 10.2 cm. Phase separation (%) was calculated by the following equation (FIG. 1A):

$$\text{Phase separation (\%)} = \left(1 - \frac{\text{Height of bottom phase (cm)}}{\text{Height of chocolate milk volume in bottle (cm)}}\right) \times 100 \quad [1]$$

Lightness readings (L*, from 0 to 100) were taken from the bottom half of each bottle (FIG. 1B) and were recorded as an average of 3 replications using a Minolta Chroma Meter CR-400 (Konica Minolta Sensing Inc., Ramsay, N.J.) calibrated with a standard white tile (calibration plate CR-400) at the beginning of each measurement day. Estimated L* values for samples processed at 0, 125, and 250 MPa were taken from the bottom of one bottle due to dense sediment formation. These values were used as estimated L* values for Day 1-14 of shelf life for 0, 125, and 250 MPa samples.

Light Microscopy

Water and cocoa (1.5% w/v) dispersions were further dispersed in 3:1 with water, placed on a glass slide covered with a cover slip, and observed using a 20× magnification lens in a light microscope (Olympus BX41TF, Olympus Optical Co. Ltd., Hitech Instruments Inc., Edgemont, Pa.) at ambient temperature.

Freeze Drying of Phase Separated Samples

Forty grams of HPJ-processed chocolate skim milk samples were stored in 50-mL centrifuge tubes at 4° C. for 14 days. After Day 14, samples had phase separated to equilibrium and subsequently fractionated into a top phase and bottom phase. Samples were then weighed and freeze dried. Freeze dried samples were weighed and relative total solids (% w/w) were measured using the following formula:

$$\% \text{ Relative total solids} = \left(\frac{\text{Weight of dried phase}}{\text{Weight of total phase}}\right) \times 100 \quad [2]$$

Fat Analysis of Phase Separated Fractions

The crude fat content of freeze dried samples was determined using a fat extractor (Ankom XT15, Ankom Technology, Macedon, N.Y.). Samples were weighed (0.2-0.3 g) in duplicate into pre-weighed filter bags and heat sealed. The crude fat was extracted for 60 min at 90° C. using petroleum ether. After extraction, samples were dried for 7 min at 105° C., cooled in a desiccant pouch to room temperature and weighed. Crude fat percentage was calculated by the formula below:

$$\text{Fat}(\%) = \frac{W_{\text{wet sample}} - W_{\text{dried sample after extraction}}}{W_{\text{wet sample}}} \quad [3]$$

Original freeze dried weight of samples and crude fat (%) were used to determine relative total fat (% w/w) in each fraction using Equation 2.

Protein Analysis of Phase Separated Fractions

Nitrogen content of freeze dried fractions was done by the Dumas method using a nitrogen analyzer (LECO FP528, LECO Corporation, St. Joseph, Mich.). Crude protein content was calculated by multiplying the total nitrogen content by a conversion factor of 6.38. Original freeze dried weight of samples and protein (%) were used to determine relative total protein (% w/w) in each fraction using Equation 2.

Sodium Dodecyl Sulfate Polyacrylamide Gel Electrophoresis (SDS-PAGE)

Sodium dodecyl sulfate-polyacrylamide gel electrophoresis (SDS-PAGE) was performed on the phase separated fractions. The two fractions were subjected to non-reducing conditions and reducing conditions using β-mercaptoethanol. The weight of protein per volume (mg/mL) for each fraction was determined by dividing the protein content (%) of each freeze dried fractions by the weight of the wet fraction. The following equations were used to determine the volume required for the same amount of protein for each well based on the fraction with the lowest protein content per volume:

$$\text{mg protein}/20 \text{ } \mu L = \frac{\text{Fraction with lowest}\left[\frac{\text{protein(mg)}}{\text{mL}}\right]}{1000 \text{ } \mu L} \times 20 \text{ } \mu L \quad [4]$$

$$\text{Sample volume per fraction } (\mu L) = \frac{\text{mg protein/well}}{\text{mg protein}/20 \text{ } \mu L} \times 1000 \text{ } \mu L \quad [6]$$

A sample volume of 20 μL was chosen for each well. For the HPJ-processed phase separated fractions subjected to non-reducing conditions, the calculated volume (Eq. 3) was mixed with non-reducing-loading buffer to a total volume of 500 μL. For the HPJ-processed samples under reducing conditions, the same calculated volume (Eq. 3) was mixed with reducing-loading buffer to a total volume of 500 μL and heated in a water bath at 95° C. for 5 min. The diluted samples were loaded onto 12% Tris-HCl polyacrylamide gels (12 wells, ReadyGel, BIO-RAD, Hercules, Calif.), with 10 μL sample in each well. The electrophoresis was run at constant 200 mV for 46 min and stained using Coomassie Blue for protein identification.

Rheological Properties

Rheological properties of Control+, HPJ-processed chocolate milk, and Control-CS samples were monitored over 14 days. HPJ-processed chocolate milk were stored in 50-mL centrifuge tubes at 4° C. for each measurement day and inverted 10 times before transfer into the rheometer. The apparent viscosity of HPJ-processed chocolate milk was calculated from flow curves (shear strain rate from 1 to 100 1/s; 20° C.) obtained using a Discovery H3 Hybrid Rheometer (TA Instruments, New Castle Del.), equipped with a double wall geometry (inside bob diameter 40.77 mm, outside bob diameter 43.88 mm, cup diameter 30.32 mm; rotor DBL-GAP H/A-AL smart swap, TA Instruments, New Castle Del.). Apparent viscosity was reported at a shear rate of 50 1/s. Experimental flow curves were fitted to the Power Law model (Steffe, 1996):

$$\tau = k\dot{\gamma}^n \quad [5]$$

where τ is shear stress (Pa); k is the consistency index; $\dot{\gamma}$ is shear rate (s$^{-1}$), and n is the flow behavior index (n=1 for Newtonian fluids, n<1 for shear-thinning fluids). For the purposes of this study, sample exhibiting flow curves with n>0.90 were considered Newtonian.

Statistical Analysis

Two replications of HPJ-processing of chocolate milk and chocolate milk with additional micellar casein were conducted. Experiments were analyzed as completely randomized design using SAS software, version 9.4 (SAS Institute, Cary, N.C.). Least Significant Difference (LSD) was used to generate 95% confidence interval for any means in which ANOVA showed significant differences (p≤0.05).

Example 1: Effect of High Pressure Jet Processing on Chocolate Skim Milk

The temperature of chocolate skim milk collected immediately after HPJ-processing increased ca.10° C. for every 125 MPa increment in HPJ pressure, which was similar to a previous study where whole milk showed the same linear temperature increase as determined by HPJ pressure (data not shown). Mohan et al., 2016 reported a sudden increase in temperature from 8° C. to 30° C. in HPJ-processed skim milk when pressure increased from 400 to 500 MPa. Studies on the processing of whole milk using High Pressure Homogenization (HPH) reported temperature increments of 15-20° C./100 MPa (Hayes and Kelly, 2003; Thiebaud et al., 2003; Hayes et al., 2005; Pereda et al., 2007). Differences in reported temperature increase in samples collected after HPJ or HPH processing may be due to valve dimensions or nozzle orifice diameter and the capacity of the heat exchanger connected right after the high pressure valve or nozzle. HPJ-processed whole milk and chocolate skim milk were processed using a 10 μm diameter nozzle whereas HPJ-processed skim milk was processed using a 4 μm diameter nozzle.

The visual stability of chocolate milk containing 0.05% κ-carrageenan (Control+), chocolate milk containing 0.5% corn starch (Control-CS), and HPJ-processed chocolate skim milk (0, 125, 250, 375, and 500 MPa), was observed over 14 days. The objective of adding corn starch was to confirm that increasing apparent viscosity alone was not sufficient to stabilize cocoa in chocolate milk and to provide further insight on the effect of HPJ processing in stabilizing chocolate milk dispersions. To account for the stabilizing effect from the particle size reduction of cocoa through shear stress in the HPJ nozzle, water and cocoa (1.5%) dispersions were also processed and used as controls (Control-ACP).

Figure 2:
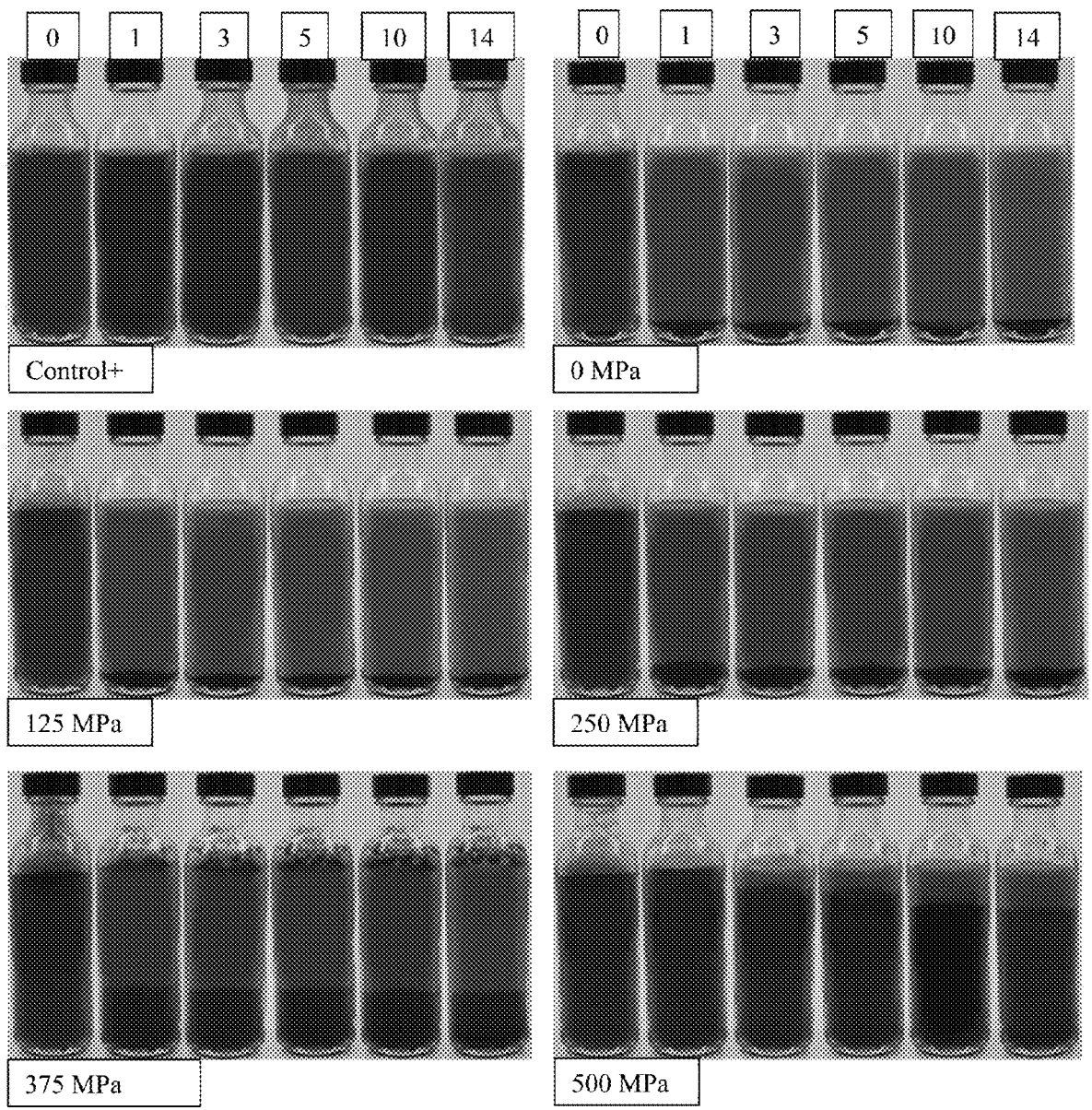
FIG. 2. Visual stability over 14 days of chocolate skim milk containing k-carrageen (Control+) and chocolate skim milk processed using HPJ at 0, 125, 250, 375, 500 MPa (0, 1, 3, 5, 10 14 are days of storage at 4° C.).

Although samples were monitored for up to 14 days, the phase separation of unstable samples occurred within one day for most samples. Chocolate milk processed at 0 MPa (Control-0 MPa) and samples processed at 125 MPa (FIG. 2) came to complete equilibrium by Day 3, while chocolate milk containing corn starch (Control-CS) (FIG. 4) and chocolate milk processed at 250, 375, and 500 MPa came to equilibrium by Day 10. Chocolate milk containing k-carrageenan (Control+) did not phase separate over the 14 day shelf life, which was the endpoint of data collection, confirming the functionality of carrageenan to suspend cocoa particles in chocolate milk (FIG. 2). Whereas chocolate skim milk processed at 0 and 125 MPa exhibited a dense sediment after the third day of storage, Control-CS and HPJ-processed chocolate milk at 250, 375, 500 MPa showed gradual phase separation into a viscous phase of suspended cocoa particles.

Figure 3:
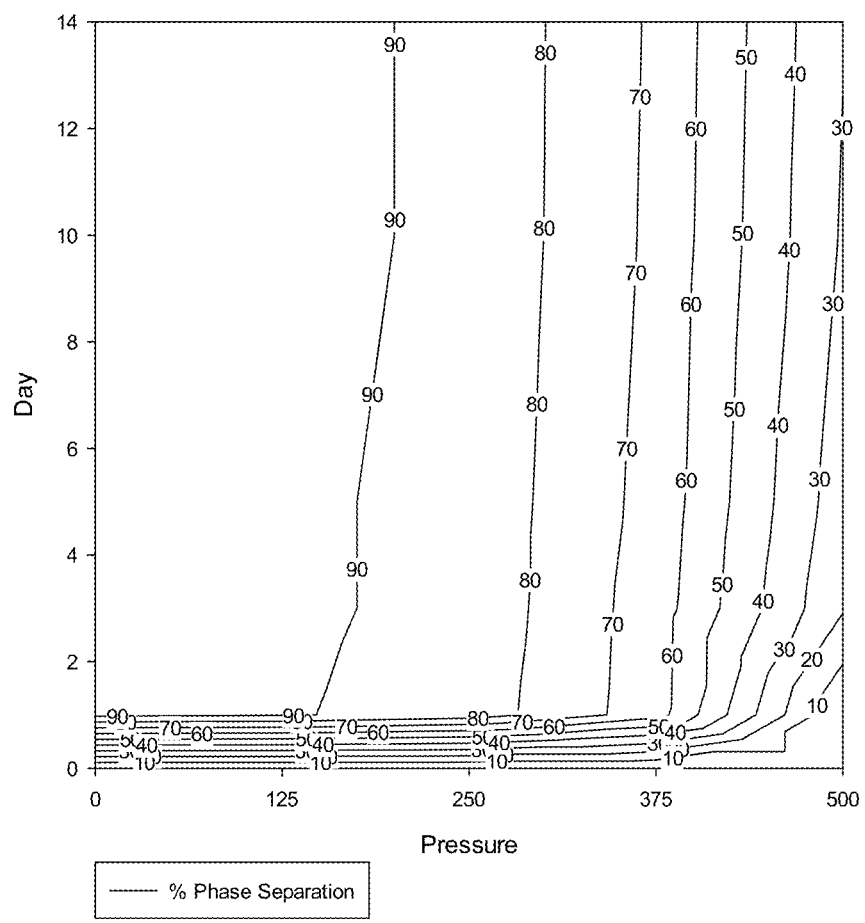
FIG. 3. Phase separation (%) of HJP-processed chocolate skim milk at 0-500 MPa over 14 day shelf-life.

The volume of the viscous bottom phase increased as the HPJ processing pressure of chocolate milk increased from 250, to 375, to 500 MPa. Little phase separation was observed in chocolate milk processed at 500 MPa after 14 days (ca. 30%) vs chocolate milk samples processed at 0 and 125 MPa where ca. 93% phase separation was recorded after the same time of storage (P<0.01; FIG. 3). The extent of phase separation in samples containing corn starch (Control-CS) was not significantly different from chocolate milk processed at 375 MPa (P>0.37).

Previous studies involving HPH and milk reported dissociation of casein micelles after processing milk at ca. 200 MPa (Hayes et al., 2005; Sandra and Dalgleish, 2005; Roach and Harte, 2008; Lodaite et al., 2009). The dissociation of casein micelles has also been studied to improve emulsion stability in raw whole milk and foam stability in pasteurized skim by adsorbing on to fat globules to prevent flocculation and coalescence and thereby reduce creaming (Hayes et al., 2005; Harte et al., 2016). It is possible that similar mechanisms may play a role in the stabilization of cocoa in HPJ-processed chocolate milks at >250 MPa. However, greater foaming properties are found when processing milk using HPJ, indicating that other mechanisms (e.g., impact of the jet stream with the surrounding atmosphere) play a significant role during HPJ processing.

In the present disclosure we tested whether the dissociation of casein proteins form casein micelles occurs when chocolate milk is processed at HPJ pressure >250 MPa leading to the expression of interfacial properties of casein proteins. These interfacial properties allow the caseins to interact with residual fat globules as well as cocoa triglycerides contributing to better dispersion stability. Although a cooling heat exchanger was placed at the exit nozzle of the HPJ system, the high shear produced at pressures >250 MPa causes temperature to increase (Tobin et al., 2015; Harte, 2016), possibly inducing hydrophobic interactions between individual caseins, fat, and cocoa triglycerides. Decrease in phase separation at pressures >250 MPa could also be due to the interaction between denatured whey proteins due to high temperature treatment and dissociated casein micelles through disulfide bridging, creating a network able to better disperse cocoa particles. Denaturation of whey proteins, especially β-1g has been reported at temperatures above 77° C. (Walstra et al., 2006; Fox et al., 2015) and processing temperatures in this disclosure were significantly higher (85-92° C.). However, all milks were subjected to a strong thermal treatment before HPJ so the extent of HPJ-induced denaturation of residual native whey proteins was probably of little significance.

Figure 4:
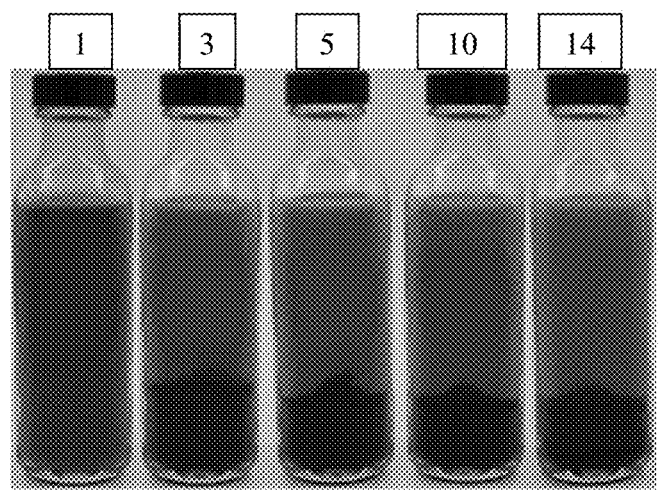
FIG. 4. Visual stability of chocolate milk over 14 days in control samples (Control-CS) where corn starch (0.5%) was added to reach an apparent viscosity of ca. 6.53 mPa s at 50 1/s.

The viscous bottom phase observed control samples containing corn starch (control-CS) is due to the ability of corn starch granules to swell and release amylose into solution to increase viscosity by absorption of water (FIG. 4). Amylose forms networks among amylose monomers through hydrogen bonding leasing to gel formation (Belitz et al., 2009). At higher concentrations, corn starch has the ability to suspend cocoa particles in chocolate milk. However, these concentrations significantly increase the apparent viscosity of the chocolate milk to levels above accepted sensory thresholds for flavored milk beverages. Additionally, corn starch has been reported to reduce flavor and impart "starchiness" at high concentrations (>5%) (Saha and Bhattacharya, 2010). In comparison to HPJ-processed samples at 500 MPa on Day 14 (FIG. 2), Control-CS samples (FIG. 4) had significantly more phase separation (31% and 72% respectively) (FIG. 3) (P<0.01). This strong phase separation also occurred in Control-CS samples containing corn starch matching the apparent viscosity of chocolate milk samples processed at 500 MPa (data not shown). This indicates that the mechanisms behind the stabilization of cocoa in HPJ-processed chocolate milk involve complex interactions beyond the sole increasing of apparent viscosity and thickness of the system.

Lightness (L*)

Lightness (L*) was measured in chocolate skim milk samples to track small changes cocoa sedimentation over time that could not be observed by the naked eye. Depending on the processing conditions and ingredients added to chocolate milk (i.e. type of stabilizer), the mechanisms to stabilize cocoa particles will differ, affecting the rate of sedimentation. Due to the formation of a dense sedimentation layer at 0, 125, and 250 MPa, L* values after Day 1 were estimated by measuring values from the bottom of the bottle and applied for the remaining shelf days.

Figure 5:
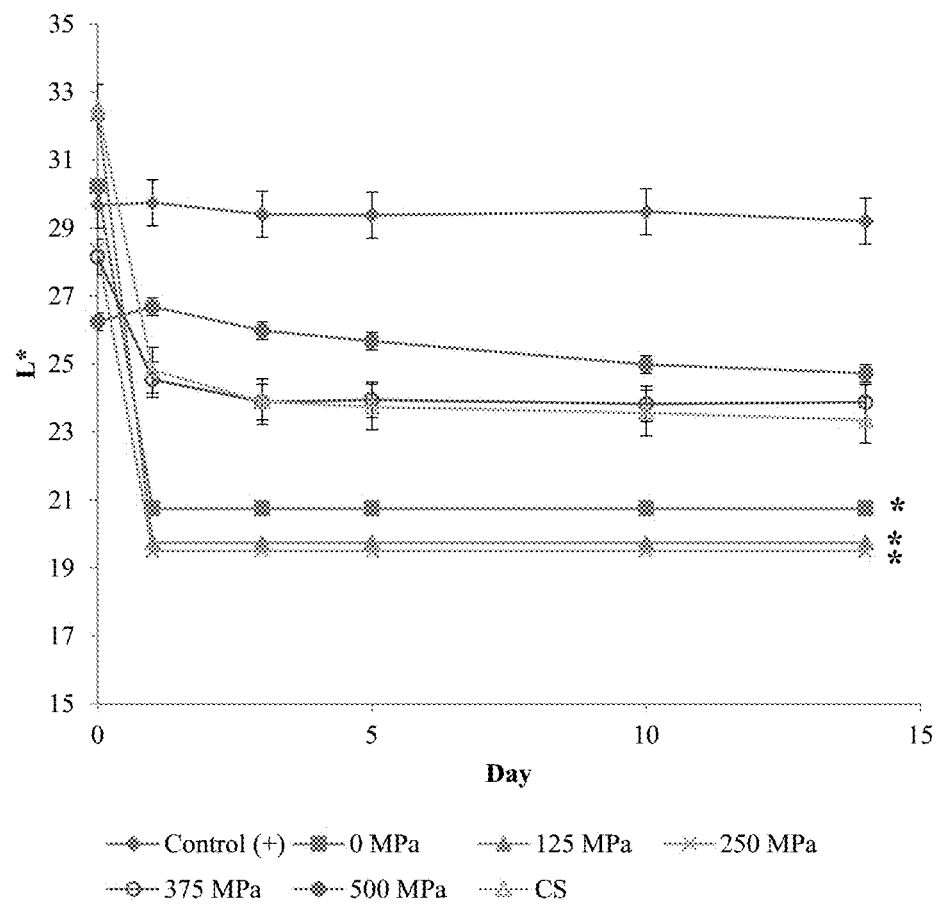
FIG. 5. Lightness (L*) of bottom phase of Control+, HPJ-processed chocolate skim milk at 0-500 MPa, Control-CS sample over 14 day shelf-life. Bars are 95% confidence intervals for the mean of each treatment day.

Similar to visual phase separation results, major changes in L* occurred within three days of the shelf life study. The Control (+) and samples processed using HPJ at 500 MPa maintained relatively constant L* values throughout the 14 day shelf-life, with no significant difference between day measurements ($P>0.05$). On Day 0, there were significant differences between HPJ-processed samples at 125, 375, 500 MPa compared to both Control+ and 0 MPa (FIG. 5) ($P<0.05$). The HPJ-processed samples at 375 and 500 MPa on Day 0 were significantly darker than both Control+ and 0 MPa ($P<0.01$), while the samples processed at <250 MPa were not significantly different than Control+($P>0.05$). Yanes et al., 2002 observed the L* values of nine different commercial chocolate milks and reported values ranging from 18.31 to 53.55, confirming that use of different hydrocolloids and processing conditions significantly alter the L* value of chocolate milk. After Day 3 of L* measurements, the Control-CS sample, and chocolate milks processed at 0 MPa, 125 MPa, and 250 MPa exhibited significantly lower L* vs. Control+ and samples processed using HPJ at pressure >350 MPa. Although little phase separation was observed in sample processed at 500 MPa, decreasing L* values over time indicated cocoa slow downward migrating (FIG. 5).

Figure 6:
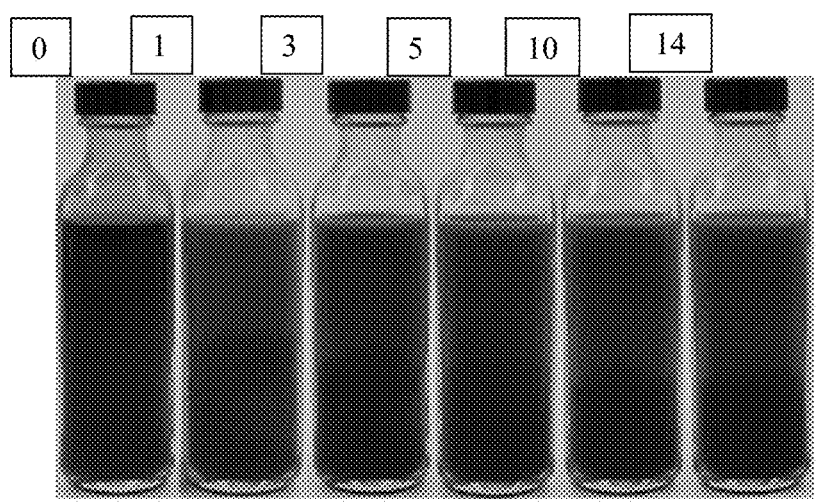
FIG. 6. Visual stability of mixed water and cocoa, heated to 85-92° C., conventionally homogenized, and then HPJ-processed at 500 MPa. Pictures taken over 14 day shelf-life stored at 4° C. (From left to right: Day 0, 1, 3, 5, 10, 14).
Figure 7:
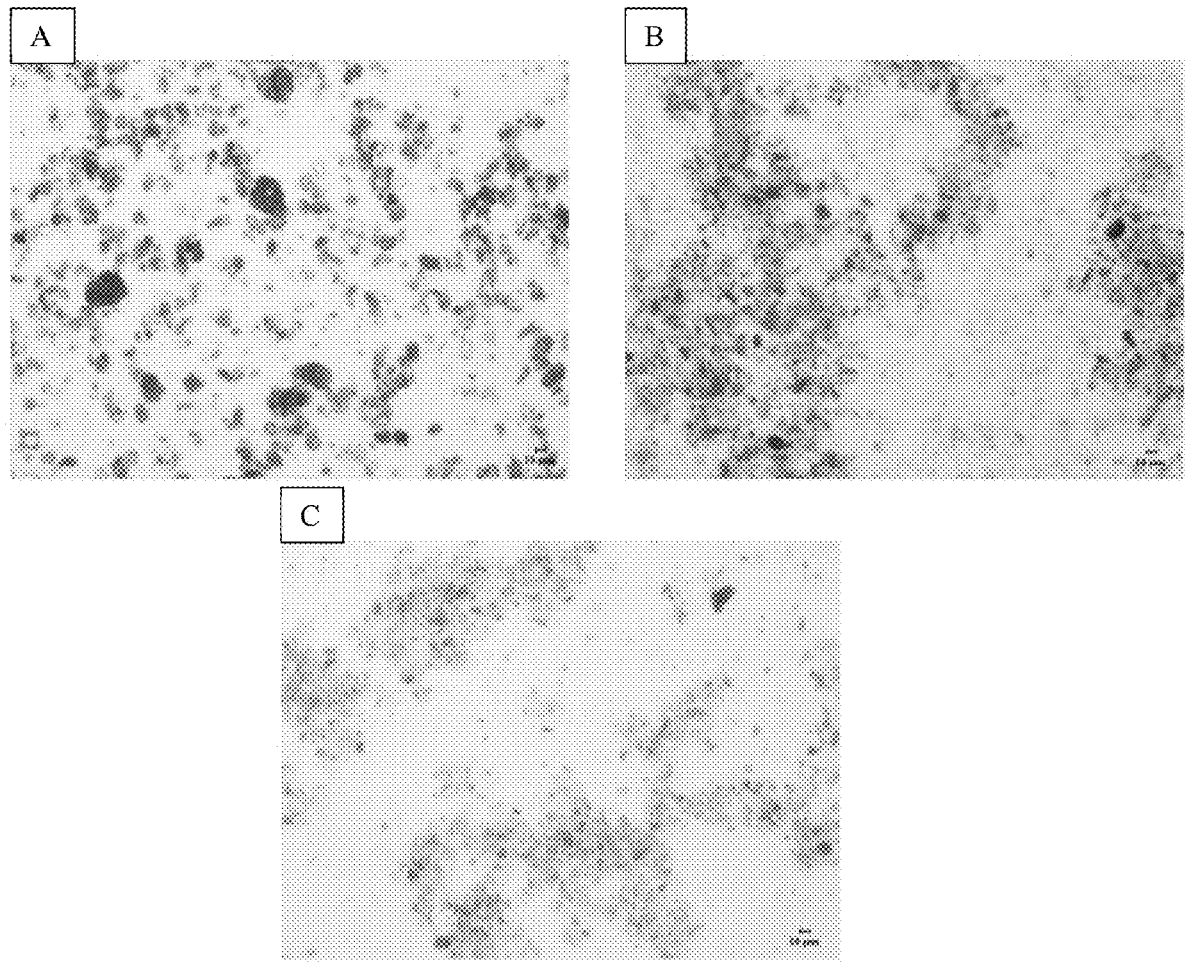
FIG. 7. Light microscopy at 20× magnification of water and 1.5% cocoa powder (A) mixed with no heat, (B) heated to 85-92° C. and conventionally homogenized (17 MPa), (C) heated to 85-92° C., conventionally homogenized, and HPJ-processed at 500 MPa. Bar represents 10 μm.

HPJ-processed water and cocoa dispersions at 500 MPa showed decreased phase separation (FIG. 6). Micrographs taken of water and cocoa dispersions under different processing conditions showed particle size reduction of cocoa particles as a result of conventional homogenization (17 MPa) and HPJ-processing at 500 MPa (FIG. 7B-C). Particle size reduction of cocoa particles was expected due to the strong shear in the HPJ nozzle of 10 µm diameter and cocoa powder particle size ranging from 10 to 70 µm (Minife, 1989; Afoakwa, 2016). HPJ-processing at 500 MPa was able to further reduce cocoa particle size compared to conventional homogenization (FIG. 7B, C). The particle size reduction of cocoa powder is able to decrease its net density and reduce rate of sedimentation according to Stoke's Law (Steffe, 1996). Since dense cocoa sedimentation was observed in HPJ-processed samples at 0, 125, and 250 MPa this indicates that pressures <250 MPa was not sufficient enough to reduce particle size for improved phase separation over time. However with HPJ-processed samples >250 MPa, the combination of particle size reduction of cocoa with structural changes in casein micelles was shown to increase dispersibility of cocoa particles in chocolate milk. Due to high temperature treatment during chocolate milk processing, it is plausible that the stabilization of cocoa particles was also explained by the gelatinization of cocoa's native starch creating interactions between cocoa particles and cocoa-casein aggregation. Although the extent of cocoa native starch gelatinization was not analyzed in this example, it is known that gelatinization of native cocoa starch rapidly occurs at temperature between 52-68° C. (Geilinger et al., 1981).

Cocoa-Casein Stability and Aggregation

Figure 8:
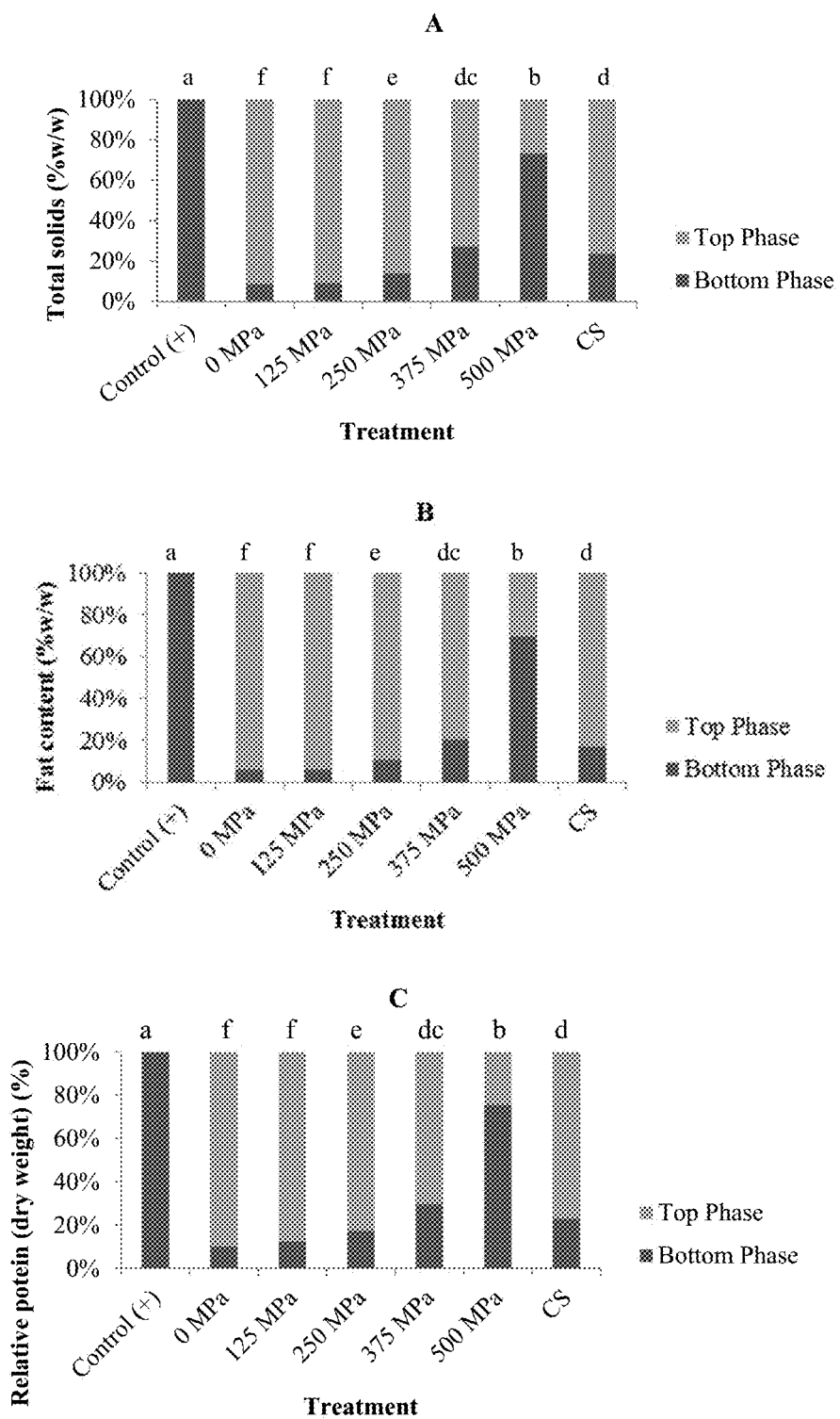
FIG. 8. Relative total solids (A), fat content (B), and protein (C) dry content (% w/w) of the top and bottom phase in Control+, HPJ-processed chocolate skim milk at 0-500 MPa, and Control-CS samples after 14 day shelf-life. 95% confidence intervals for: dry weight=±2.75% w/w; fat content=±2.06% w/w; protein content=±2.47% w/w. Means followed by the same letter are not significantly different using LSD (P<0.05).

After Day 14 of shelf-life, the phase separated portions of the bottles (top and bottom phases) were fractionated and freeze-dried. In order to confirm increased interaction between casein and cocoa to stabilize chocolate milk, the relative content (% w/w) of total solids, fat, and protein in each phase was measured. Relative values of all three fractions were recorded to compare significant changes due to treatments. The observed changes due to the various processing treatment were similar for total solids, fat content, and protein content, i.e., no significant difference was found between samples processed at 0 MPa and 125 MPa ($P>0.05$), and chocolate milks samples processed at 500 MPa were significantly different to all other treatments ($P<0.01$) (FIG. 8). Due to the stability of samples containing κ-carrageenan (Control+), there was no change in total solids, fat content, or protein content indicating a homogenous dispersion of cocoa, carrageenan, sugar, and milk solids. With increasing pressure, a concomitant increase in all fractions content was observed in the bottom phase, with samples at 500 MPa reaching ca. 72%, 69%, and 75% (w/w), of total solids, fat and protein content, respectively in the bottom phase, respectively (FIG. 8). The total solids (% w/w) measured in the bottom phase of samples processed at 0 MPa (Control-0 MPa) and 125 MPa were mostly constituted by cocoa solids due to the dense sediment formed after Day 1 (FIG. 8A). Increases in fat and protein content in samples processed using HPJ indicate that fat and protein content were provided by both cocoa and milk (FIG. 8B, C). Low values of total solids (ca. 21% w/w), fat content (ca. 15% w/w), and protein content (ca. 21% w/w) for Control-CS samples further confirms that increasing viscosity was not sufficient to disperse cocoa particles and that total solids were constituted by corn starch and cocoa sediments.

Increased interaction between milk fat and casein was observed when processing whole milk using HPJ at increasing processing pressure (data not shown) and it is suggested that a similar interaction occurred between cocoa fat and casein proteins. Since the majority of the fat in chocolate skim milks was provided by the cocoa, it is probable that the increase in relative total solids observed with increasing HPJ pressure treatment was explained by hydrophobic interactions between cocoa triglycerides and dissociated casein proteins.

Figure 9:
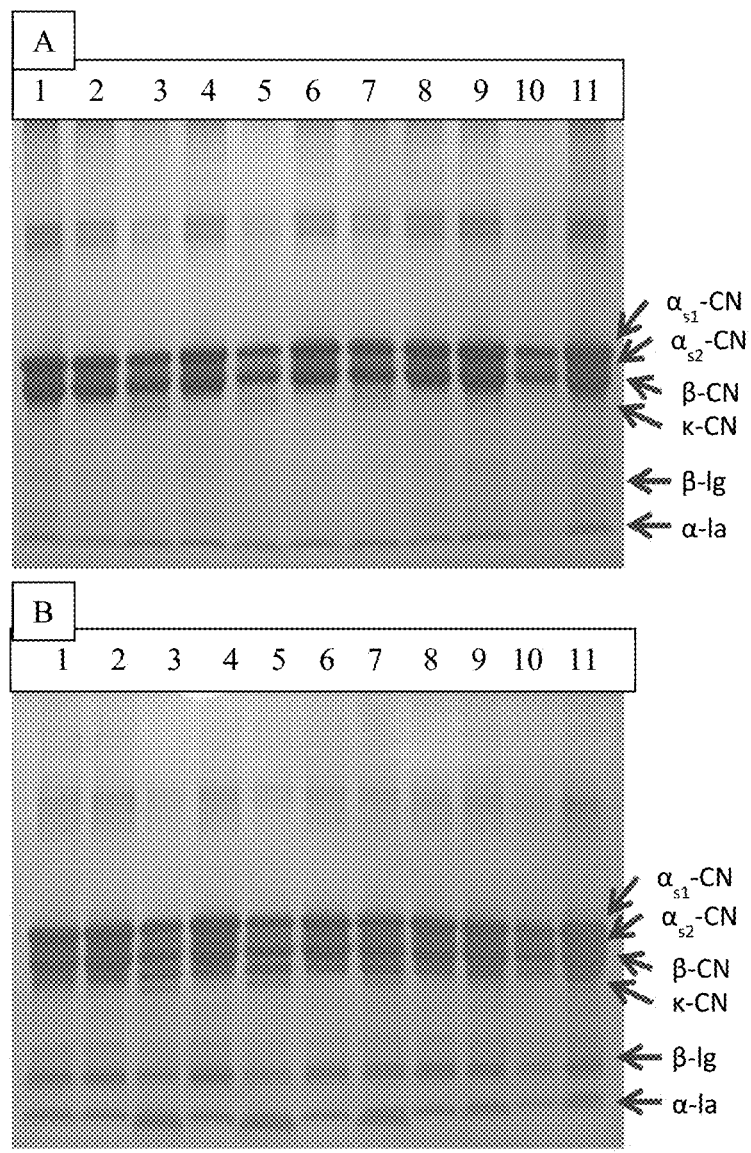
FIG. 9. SDS-PAGE Electrophoretograms of: (A) Non-Reducing Conditions. Control+ and phase separated and fractionated HPJ-processed chocolate skim milk at 0, 125, 250, 375, and 500 MPa (lane 1: Control+; lanes 2, 4, 6, 8, 10: top phase of 0, 125, 250, 375, 500 MPa, respectively; lanes 3, 5, 7, 9, 11: bottom phase of 0, 125, 250, 375, 500 MPa, respectively) and (B) Reducing Conditions. Control+ and phase separated and fractionated HPJ-processed chocolate skim milk at 0, 125, 250, 375, and 500 MPa (lane 1: Control+; lanes 2, 4, 6, 8, 10: top phase of 0, 125, 250 375, 500 MPa, respectively; lanes 3, 5, 7, 9, 11: bottom phase of 0, 125, 250, 375, 500 MPa, respectively).

Electrophoresis (SDS-PAGE) under non-reducing (FIG. 9A) and reducing conditions (FIG. 9B) was conducted on each of the two phases of chocolate milks to determine differences in association of caseins and whey proteins due to HPJ processing. Due to the high temperatures used during the processing of all chocolate skim milks, complete whey protein denaturation occurred evidenced by the lack of β-1g monomers in gels ran under non-reducing conditions (FIG. 9A). Under reducing conditions, β-1g monomers were observed again (as expected), along with thicker α-1a bands associated to the bottom phase in chocolate milks, indicating that partial denaturation of α-1a occurred too (FIG. 9B). The thicker bands observed for caseins with bottom phase (denoted by odd numbers) under non-reducing conditions (FIG. 9A) with increasing pressure indicated higher casein concentration and denatured whey protein, contributing to the stabilization of cocoa particles and reduction in phase separation with pressures >375 MPa. The top phase of chocolate milk processed using HPJ under reducing conditions (FIG. 9B, lanes 2 4, 6, 8, 10), showed a reduction in the relative concentration of α-lactalbumin as the processing pressure increased from 0 to 500 MPa, indicating that this whey protein may play a role in the HPJ induced stabilization of chocolate milk.

Rheological Properties of HPJ-Processed Chocolate Skim Milk

Figure 10:
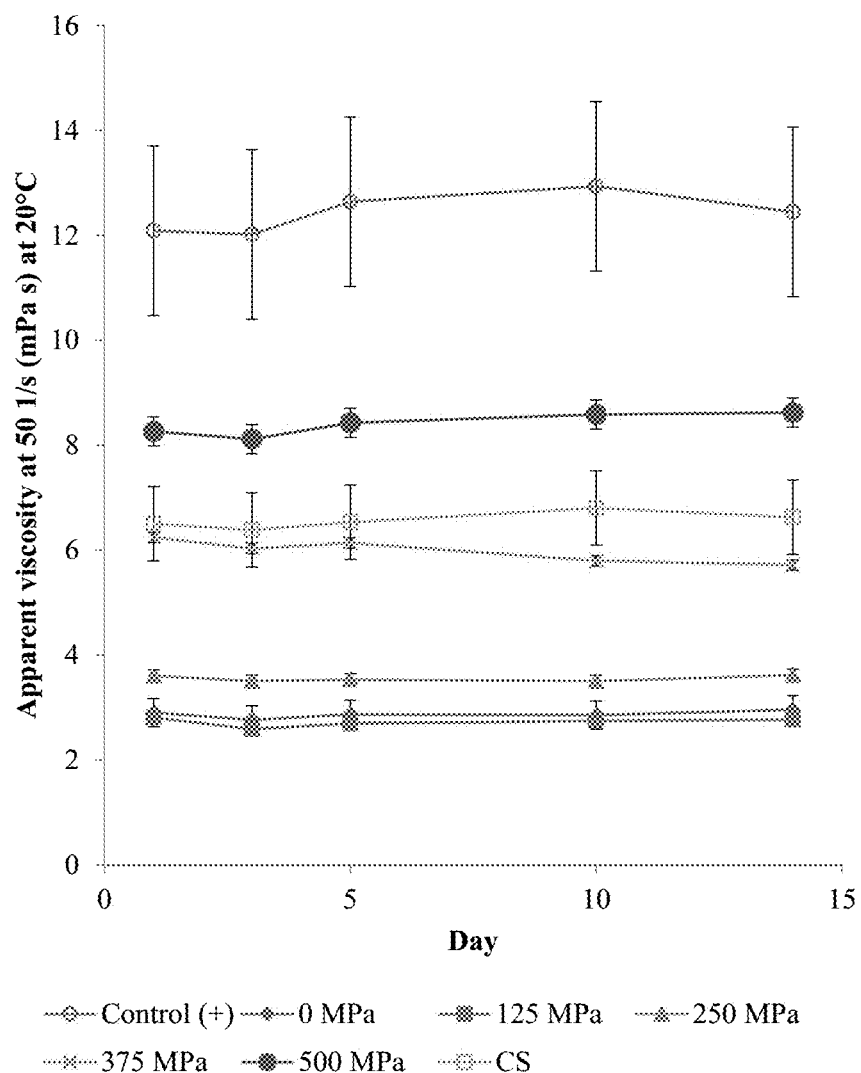
FIG. 10. Apparent viscosity at shear rate 50 1/s of Control+, HPJ-processed chocolate milk at 0-500 MPa, and Control-CS sample over 14 day shelf-life. Bars are 95% confidence intervals for the mean of each treatment day.

The apparent viscosity measured at 50 1/s shear rate of all chocolate milks was not significantly different throughout the shelf life of each treatment (P>0.05) (FIG. 10). As expected, Control+samples showed the highest apparent viscosity (ca.12.4±1.6 mPa s) due to the known gel network formed between K-carrageenan-K-casein entrapping cocoa particles. Corresponding to phase separation results, the increase in HPJ processing pressure also increased apparent viscosity chocolate milk. The apparent viscosity of chocolate milk processed at 500 MPa (8.36±0.28 mPa s) was significantly higher than all chocolate milks processed using HPJ at <375 MPa and the Control-CS sample containing corn starch (FIG. 10). As mentioned previously, commercial chocolate milk beverages range in apparent viscosities from 5-12 mPa s at 25° C. (Yanes et al., 2002), therefore apparent viscosity of 500 MPa would be acceptable by commercial standards.

These results suggest that HPJ processing of chocolate milk results in a casein-casein and casein-cocoa network able to partially suspend cocoa particles in chocolate milk. Although the Control-CS chocolate milk samples were prepared with apparent viscosity values matching those of chocolate milks processed at 375 MPa and 500 MPa, more than 50% phase separation was observed in all chocolate milk containing corn starch, suggesting that a more complex interactions in HPJ-processed chocolate milks are responsible for improved stabilization.

Figure 11:
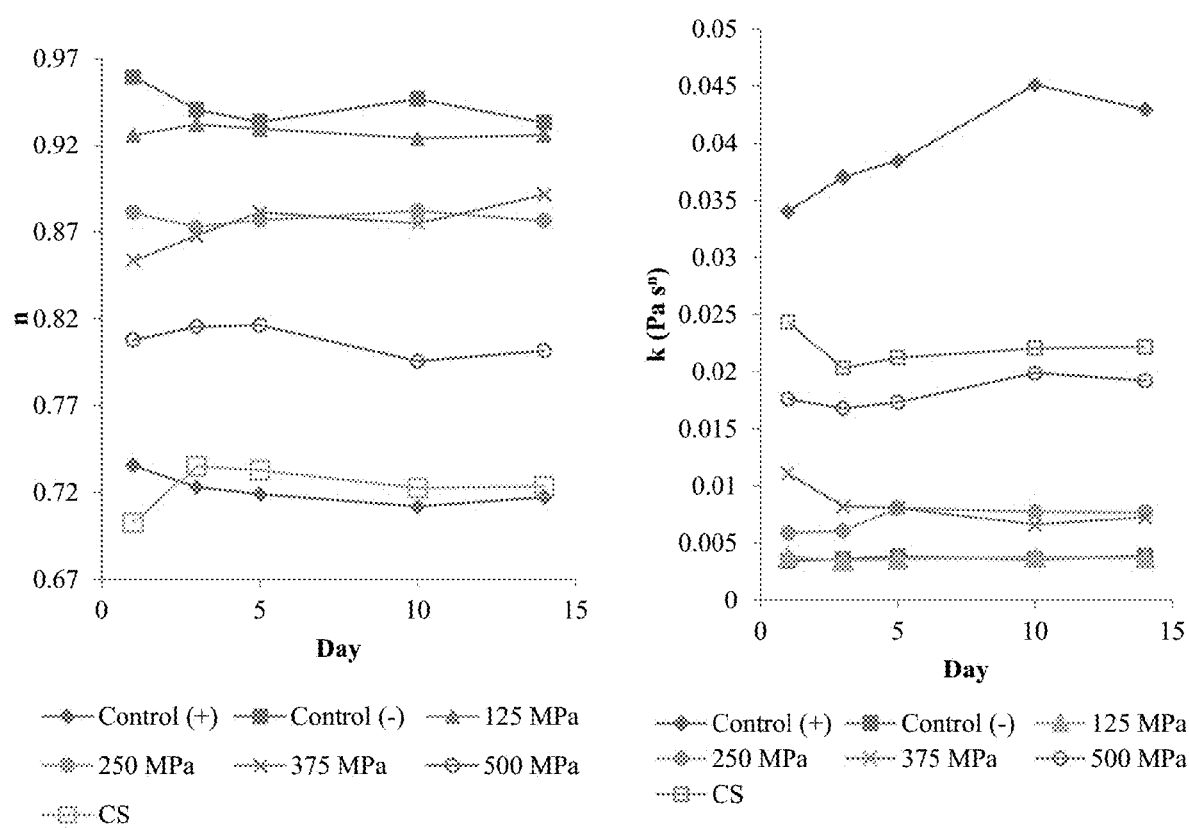
FIG. 11. Power Law parameters, flow behavior index (n) and consistency index (k) determined for Controls+, HPJ-processed chocolate skim milk at 0-500 MPa, and Control-CS sample over 14 day shelf-life. 95% confidence intervals for the means are as follows (n/k): Control+=0.08/0.02 Pa $s^n$; 0 MPa=0.04/<0.01 Pa $s^n$; 125 MPa=0.03/<0.01 Pa $s^n$; 250 MPa=0.03/<0.01 Pa $s^n$; 375 MPa=0.06/<0.01 Pa $s^n$; 500 MPa=0.03/<0.01 Pa $s^n$; Control-CS=0.03/0.01 Pa $s^n$.

Flow curves of Controls+chocolate milk, HPJ-processed chocolate skim milk, and Control-CS samples were fitted by the Power-Law model, with flow behavior index (n) and consistency index (k) monitored over the 14 day shelf-life. There was no significant difference among days for each chocolate milk treatment (P>0.05). Control+exhibited the strongest shear-thinning behavior (n<0.75) and thickest consistency index (k>30 mPa s$^n$) (FIG. 11). This was expected as the addition of k-carrageenan to chocolate milk is known to result in shear thinning behavior. We also expected samples containing k-carrageenan to exhibit yield stress at close to 0 1/s shear rate. However, samples exhibited flow even at shear rates close to 0 1/s. The Control-0 MPa chocolate milk and chocolate milk processed with HPJ at 125 MPa exhibited Newtonian behavior (n=>0.90) and the lowest viscosity (η=0.01 Pa s; FIG. 11). As expected, no network formation occurred at low HPJ processing pressures as no dissociation of casein micelles occurred under these conditions. Similar results were reported in the case of milk processing using pressure technologies below 200 MPa. Lodaite et al., 2009 reported no significant difference in rennet gelation time and gel strength between untreated skim milk and HPH skim milk at 100 MPa. Similarly, Mohan et al., 2016 observed no significant difference in rennet gelation time of HPJ processed skim milk 0 and 100 MPa. In chocolate milks processed using HPJ at 250 and 375 MPa, a weak shear-thinning behavior was observed with no significant difference between treatments (P>0.05). Chocolate milk processed using HPJ at 500 MPa showed higher shear-thinning behavior and a consistency index >0.015 Pa s$^n$.

van den Boomgaard et al., 1987 studied the physical stability of chocolate milk using two different cocoa powders and "cocoa-particle-free" chocolate milk by creating a cocoa extract. The study reported protein adsorption onto cocoa particles and reported that the stability of chocolate milk depended on interactions between cocoa particles themselves. However, a mechanism for the interaction between cocoa and proteins was not suggested. The present disclosure in chocolate milk processed using HPJ indicate that dissociated casein proteins from casein micelles play a significant role in stabilizing cocoa particles. Furthermore, this stabilization phenomenon is probably explained by casein protein monomers exhibiting interfacial properties that favor the interaction with cocoa constituents.

Example 2: Influence of Added Micellar Casein to HPJ-Processed Chocolate Skim Milk Based on results from Example 1, the incorporation of additional micellar casein at different concentrations to chocolate milk processed at 500 MPa was analyzed. Micellar casein at concentrations of 1%, 2%, or 4% (w/v) were used.

Phase Separation

Visual phase separation of samples was observed for all pressures (125-500 MPa) at all added micellar casein concentrations (1%, 2%, or 4% w/v) over 14 days stored at 4° C. We expected that with increasing concentration of micellar casein, phase separation would decrease in chocolate milk processed at 500 MPa. Previous studies reported improved emulsion stability when adding micellar casein to the formulation. The stability of corn oil emulsions was improved when samples were processed at 300 MPa and contained increased amounts of micellar casein (San Martin-Gonzalez et al., 2009). HPH and skim milk with varying casein to whey protein ratios reported increase in viscosity with higher micellar content and pressure of 300 MPa at pH 5.8 (Sorensen et al., 2014).

Figure 12:
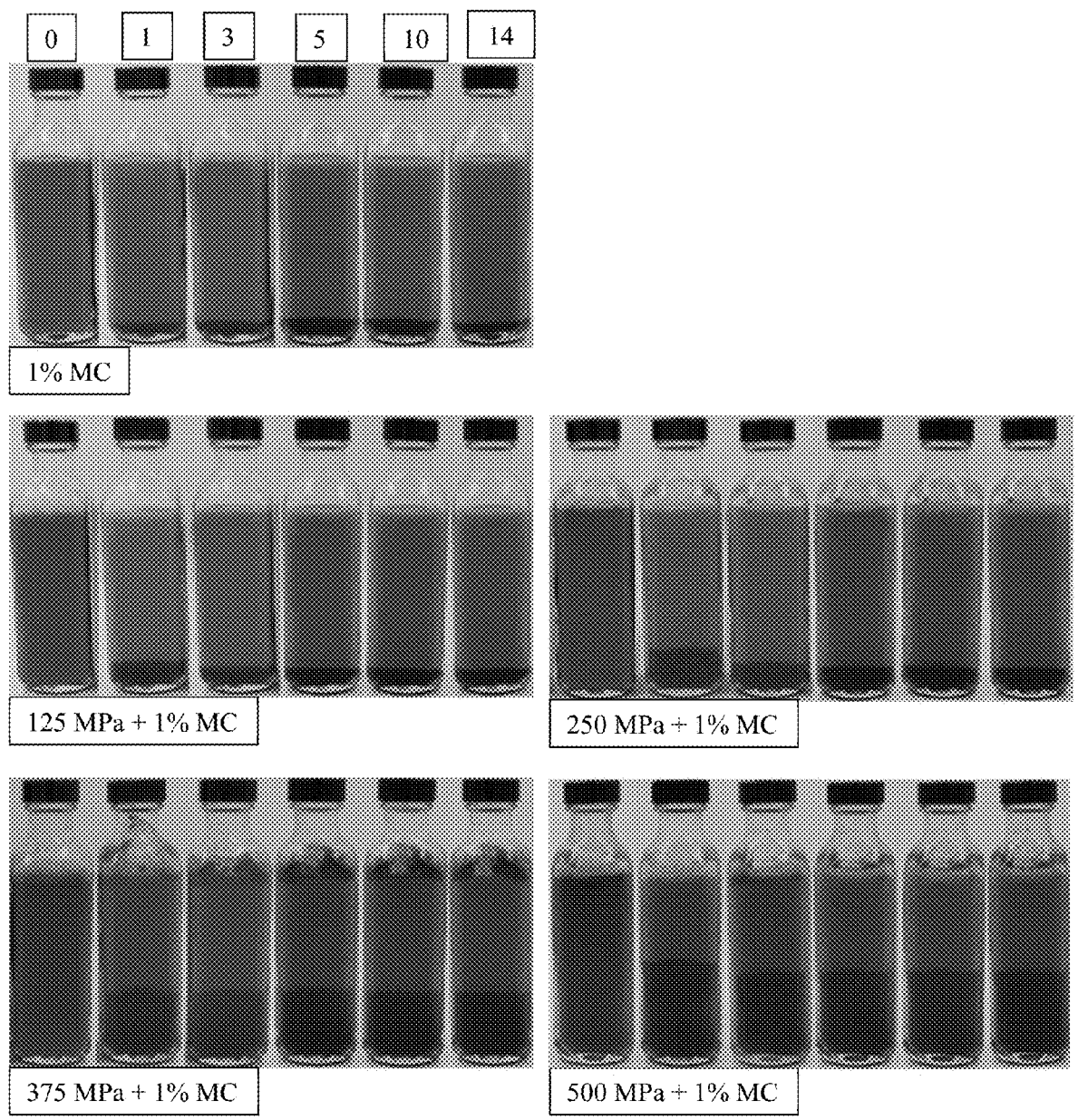
FIG. 12. Visual stability of cocoa over 14 days in untreated samples with 1% w/v Micellar Casein (MC), and HPJ-processed chocolate skim milk fortified with 1% w/v MC processed at 125 MPa, 250 MPa, 375 MPa, and 500 MPa. (From left to right: Day 0, 1, 3, 5, 10, 14.)
Figure 13:
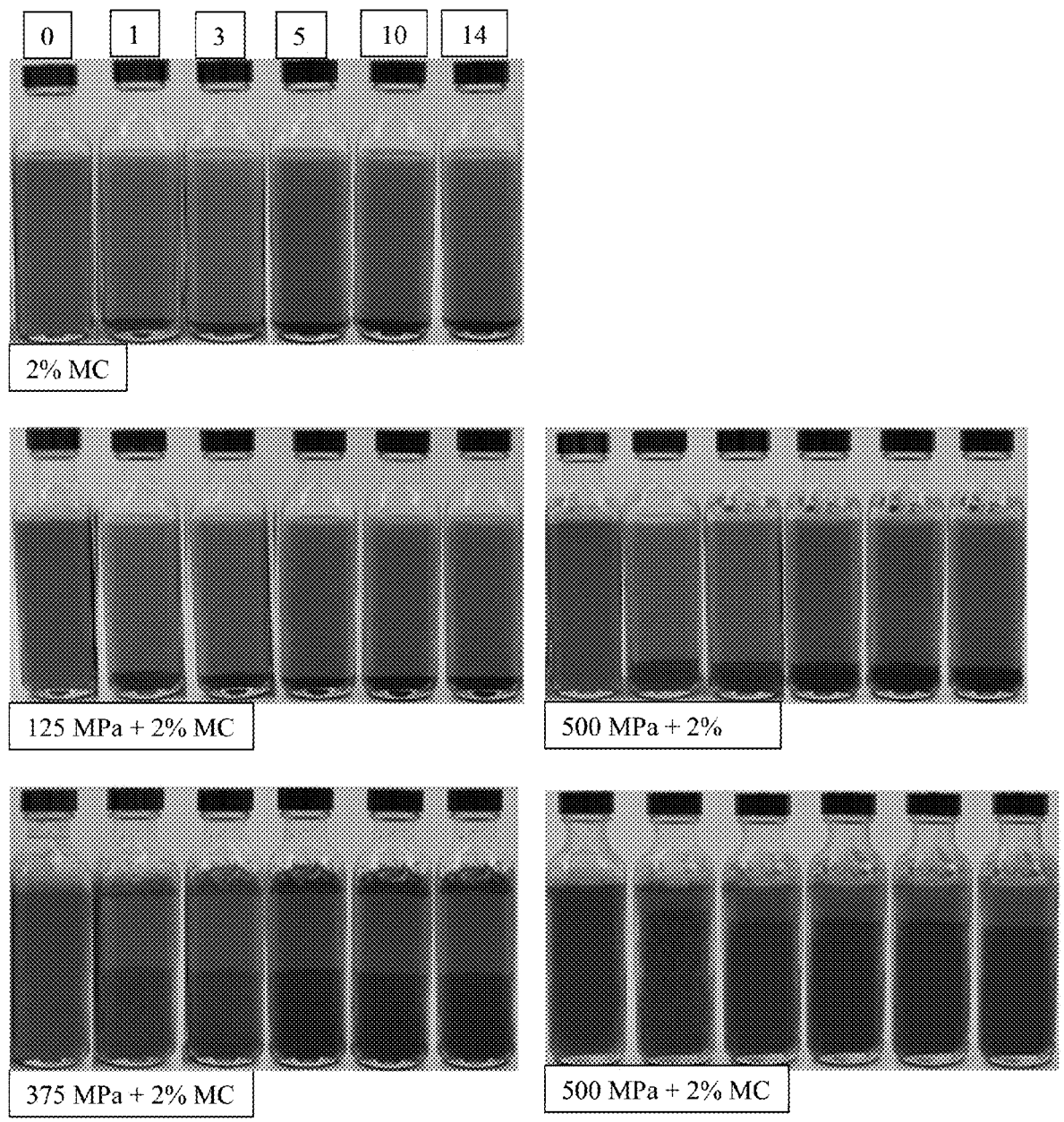
FIG. 13. Visual stability of cocoa over 14 days in untreated samples with 1% w/v Micellar Casein (MC), and HPJ-processed chocolate skim milk fortified with 2% w/v MC processed at 125 MPa, 250 MPa, 375 MPa, and 500 MPa. (From left to right: Day 0, 1, 3, 5, 10, 14.)
Figure 14:
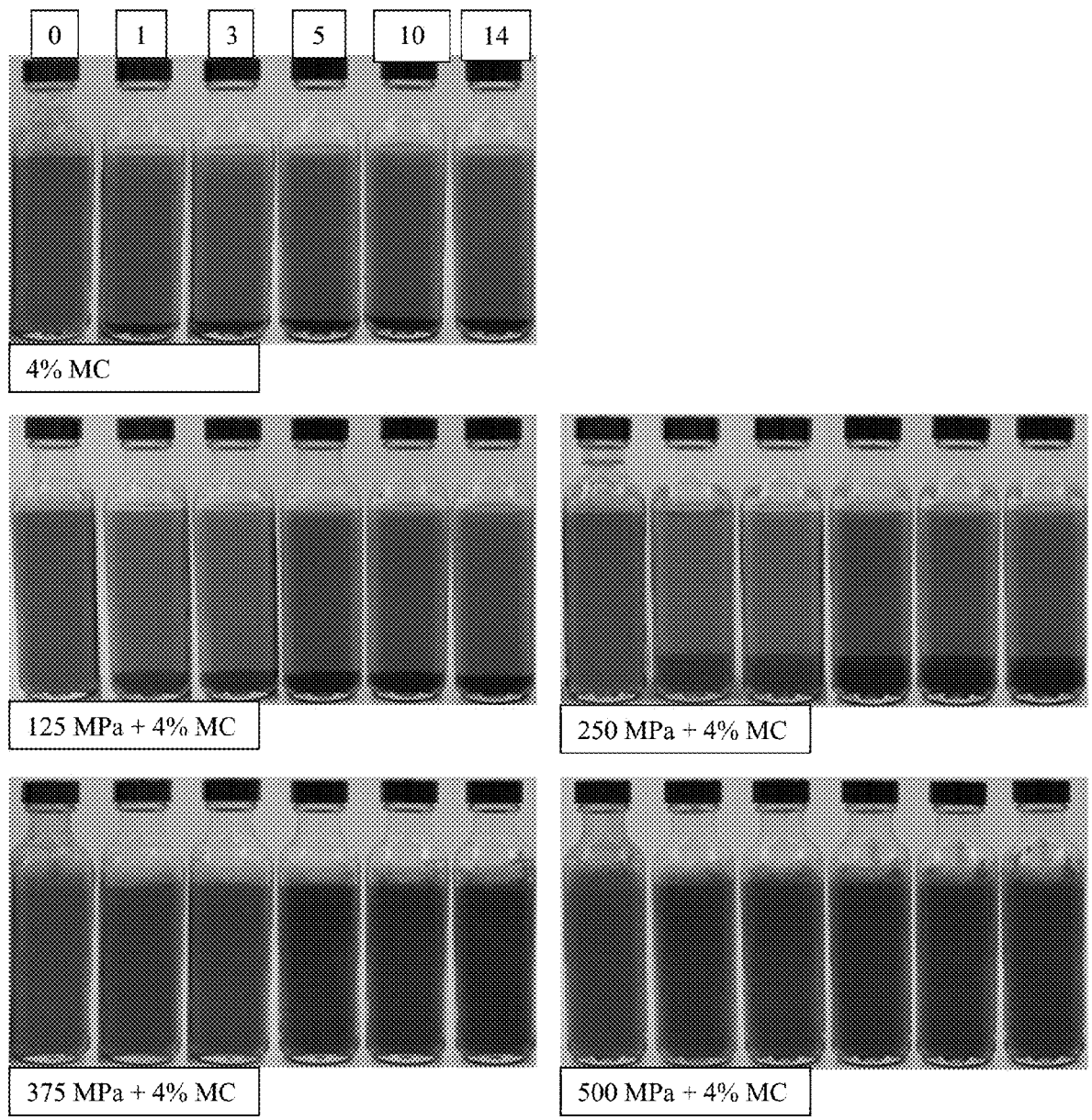
FIG. 14. Visual stability of cocoa over 14 days in untreated samples with 1% w/v Micellar Casein (MC), and HPJ-processed chocolate skim milk fortified with 4% w/v MC processed at 125 MPa, 250 MPa, 375 MPa, and 500 MPa. (From left to right: Day 0, 1, 3, 5, 10, 14.)
Figure 15:
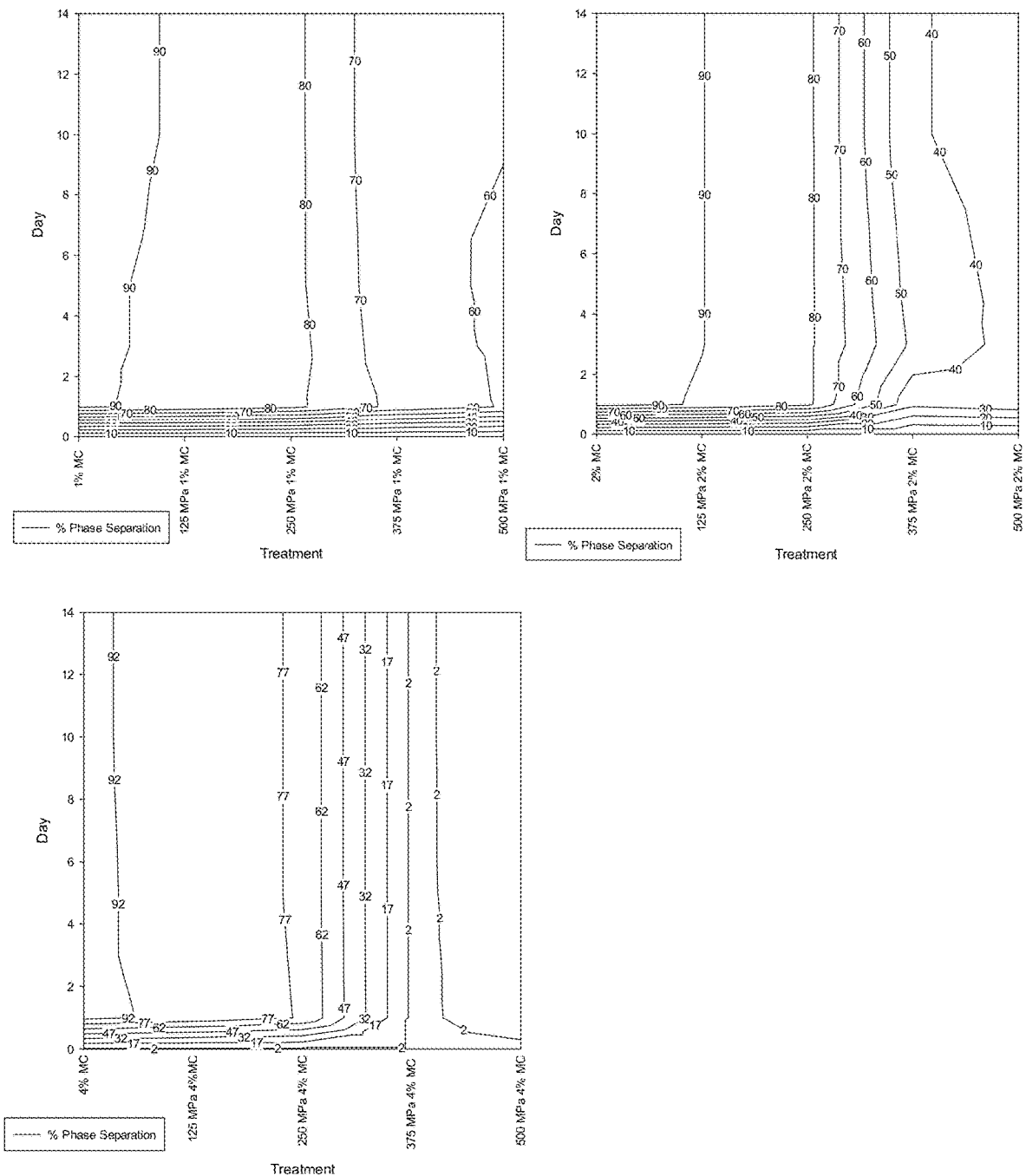
FIG. 15. Phase separation (%) of controls (1%, 2%, or 4% w/v Micellar Casein, MC) and HPJ-processed skim milk fortified with 1%, 2%, or 4% MC processed from 125-500 MPa.

Similar to Example 1, the majority of phase separation in chocolate milk occurred after Day 1 and samples came to equilibrium after Day 3 of shelf life. Contrary to expected results, a reduction in stability was observed when micellar casein was added to 1% and 2% w/v and then the fortified chocolate milk was processed using HPJ at 500 MPa (FIG. 12, FIG. 13) vs. chocolate skim milk (not fortified) processed using HPJ at 500 MPa (FIG. 2). The addition of 1% and 2% micellar casein, did not have a positive effect when chocolate milk was processed at pressures <375 MPa, as phase separation was similar to those found in Example 1 for HPJ-processed chocolate skim milk (ca. 80% phase separation after Day 3) (FIG. 15). However, with the addition of 4% micellar casein, no phase separation was observed at 375 and 500 MPa after 14 days (FIG. 14, FIG. 15).

Multiple mechanisms may be responsible for stabilization of chocolate milk at high micellar casein concentration (e.g., 4% w/v) and HPJ processing. Similarly to chocolate skim milk, we tested whether casein-casein and casein-cocoa interactions induced by HPJ play a role promoting stability. The HPJ-induced reduction in particle size of both, casein micelles and cocoa particles, may lead to perikinetic aggregation (Walstra, 2003) and the formation of stable cocoa-casein aggregates in chocolate milk. Perikinetic aggregation is dependent on reduced particle size at constant volume fraction which occurs in HPJ-processed chocolate milk at processing pressures >300 MPa.

Lightness (L*)

Lightness was also measured in this disclosure to track rate of sedimentation and to determine differences with added micellar casein. L* was only observed in samples with added micellar casein and processed using HPJ at 500

Figure 16:
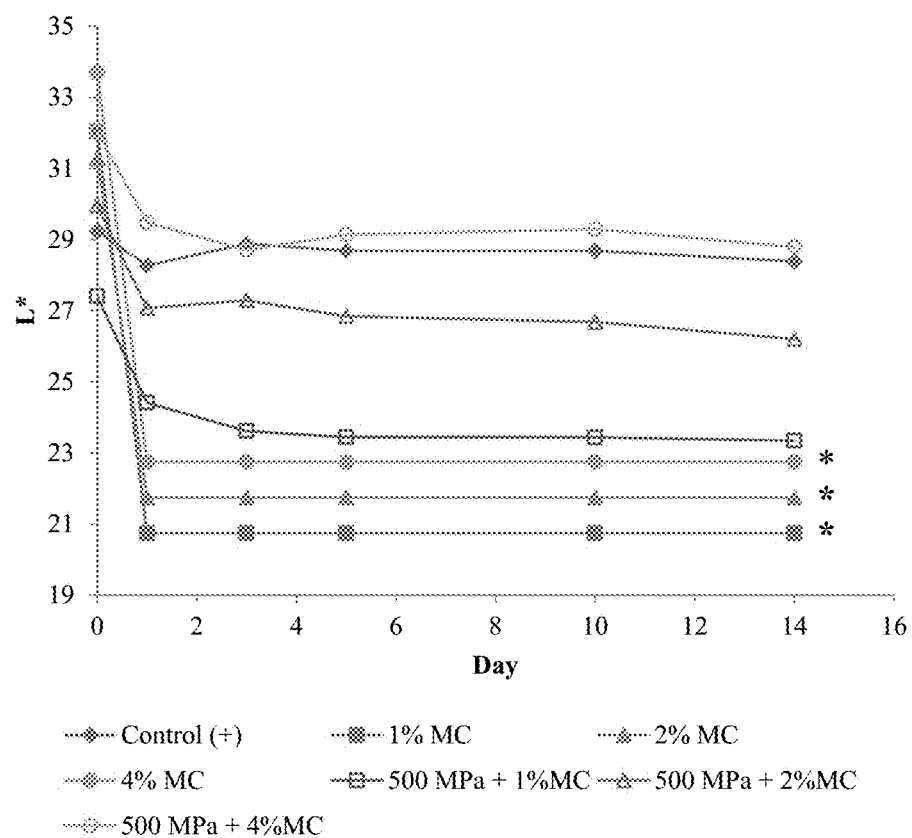
FIG. 16. Lightness (L*) of bottom phase of Controls (1%, 2%, or 4% w/v micellar casein, MC) and HPJ-processed chocolate skim milk fortified with 1%, 2%, or 4% w/v MC and processed using HPJ at 500 MPa over 14 day shelf-life. 95% confidence intervals for the means are as follows: Control+=0.85; 500 MPa+1% MC=0.60; 500 MPa+2% MC=1.89; 500 MPa+4% MC=2.33. *Estimated L* of cocoa sediment for Day 1-14.

MPa. Corresponding to changes in phase separation, an increase in micellar casein concentration increased L* values, indicating better dispersion cocoa particles. No significant changes in L* were observed between days of each treatment after Day 3 (P>0.05). Chocolate milk containing 1% w/v micellar casein and processed using HPJ at 500 MPa had a significantly lower L* value vs. all other treatments (P<0.01). As the micellar casein content increased, the L* value increased, and samples containing 4% micellar casein showed L* values that were not significantly different from Control+samples containing k-carrageenan. Although no visual phase separation was observed for chocolate milk containing 4% micellar casein at processed at 500 MPa, a reduction in L* after Day 1 and 3 indicated slight downward migration of cocoa particles (FIG. 16). The addition of micellar casein only (no processing using HPJ) at any concentration did not reduce cocoa sedimentation, and a dense cocoa sediment was observed after Day 1 in all chocolate milks.

Influence of Casein Concentration on Cocoa-Casein Stability and Aggregation

Figure 17:
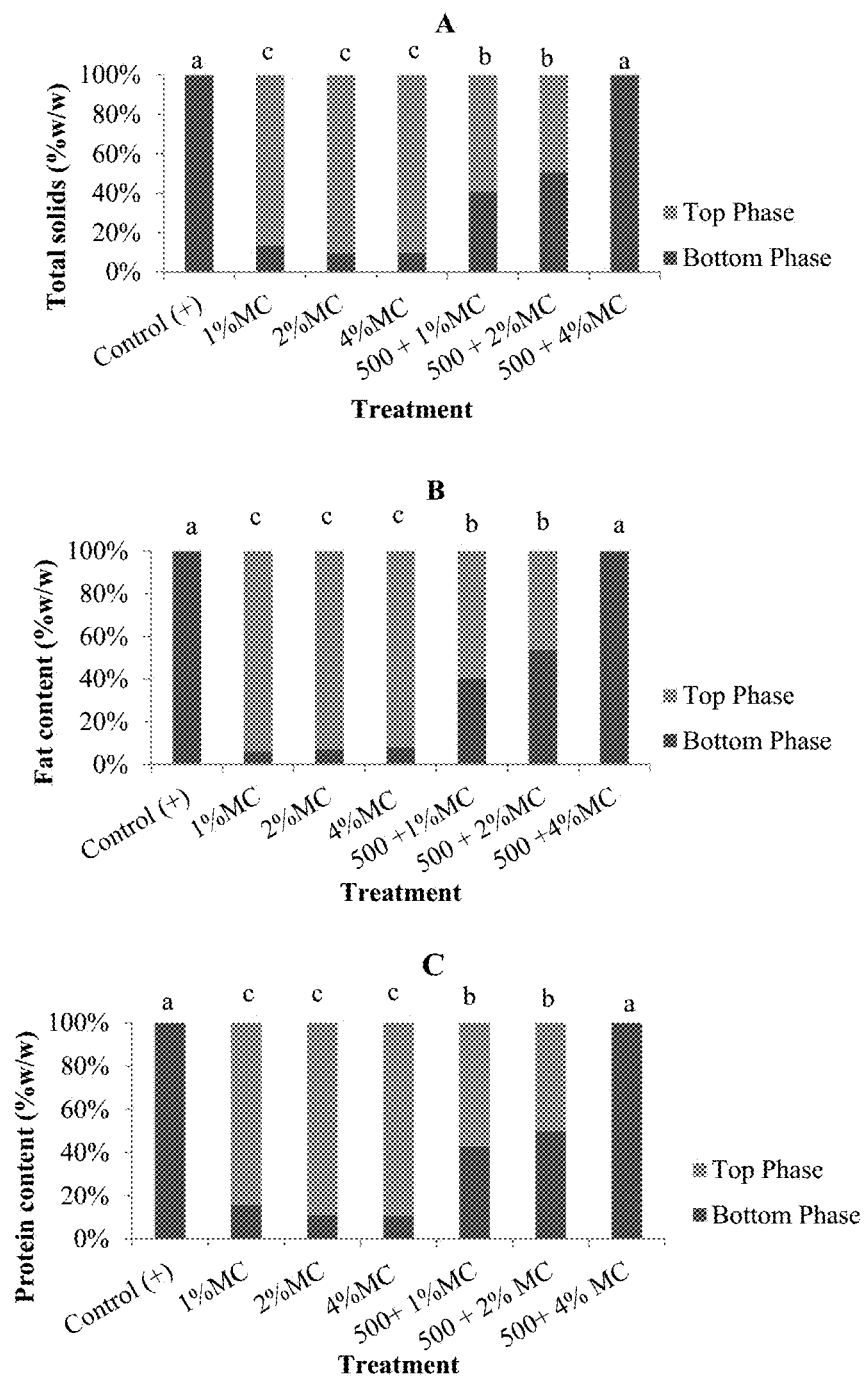
FIG. 17. Relative (% w/w) total solids (A), fat content (B), and protein content (C) of top and bottom phase of Control-0 MPa (1%, 2%, or 4% Micellar Casein, MC) and chocolate skim milk fortified with 1%, 2%, or 4% MC and processed using HPJ at 500 MPa after 14 days shelf-life. 95% confidence interval for: dry weight=6.73% w/w; fat content=9.22% w/w; protein content=5.91% w/w. Means followed by the same letter are not significantly different using LSD (P<0.05).

In order to observe increased interaction between proteins and cocoa as a result of increased micellar casein content in chocolate milk, relative (% w/w) total dry weight, fat, and protein content were observed after phase separation reached equilibrium at Day 14. The net increase in total solids (% w/w) and protein content (% w/w) in the bottom phase of chocolate milks was due to the addition of micellar casein to the system. However, the corresponding increase in fat content (% w/w) in the bottom phase of chocolate milk samples processed at 500 MPa indicate increased interactions between cocoa particles and caseins, as the majority of collected fat was originated in the cocoa (FIG. 17). This was confirmed in the unprocessed (no HPJ) chocolate milk samples where the dry weight solids in the bottom phase were not significantly different regardless of the micellar casein content (P>0.05).

Rheological Properties

Figure 18:
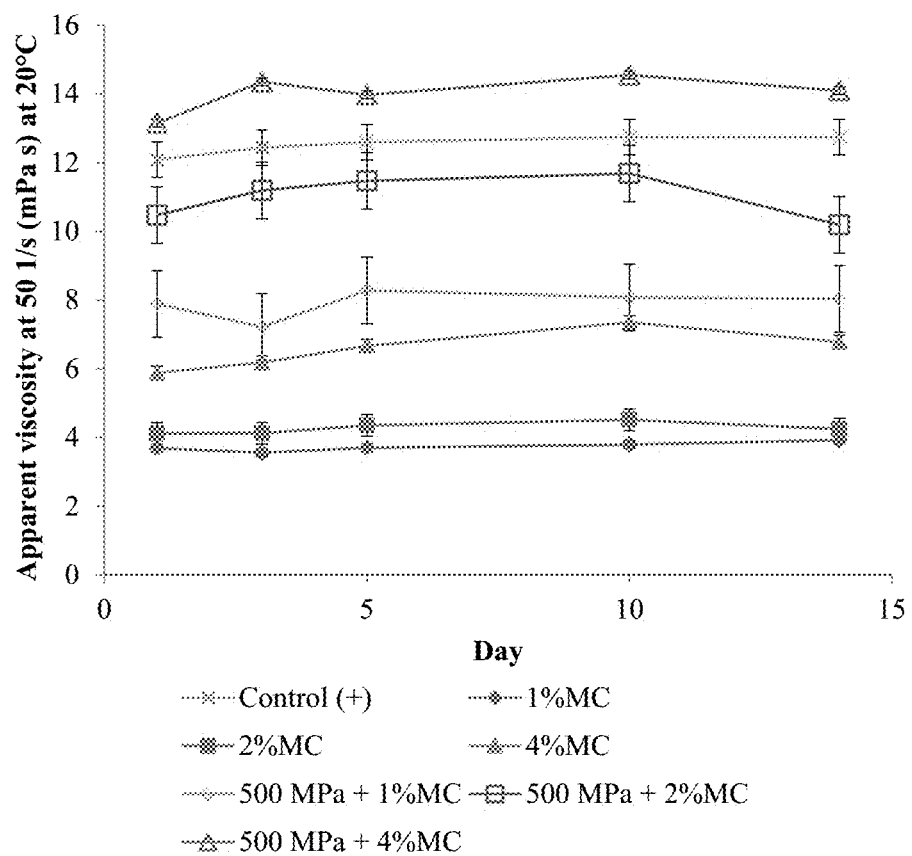
FIG. 18. Apparent viscosity at shear rate 50 1/s of Control+, HPJ-processed chocolate milk at 0-500 MPa, and Control-CS sample over 14 day shelf-life. Bars are 95% confidence intervals for the mean of each treatment day FIG. 19. Power Law parameters, flow behavior index (n) and consistency index (k) determined for chocolate milk fortified with 1%, 2%, or 4% micellar casein (MC) and chocolate skim milk fortified with 1%, 2%, or 4% MC and processed using HPJ at 500 MPa over 14 day shelf-life. Control+: chocolate skim milk containing k-carrageenan. 95% confidence intervals for the means are as follows (n/k): Control+=0.07/0.03 Pa $s^n$; 1% MC=0.03/<0.01 Pa $s^n$; 2% MC=0.02/<0.01 Pa $s^n$; 4% MC=0.04/<0.01 Pa $s^n$; 500 MPa+1% MC=0.04/0.01 Pa $s^n$; 500 MPa+2% MC=0.02/0.01 Pa $5^n$; 500 MPa+4% MC=0.02/0.02 Pa $s^n$.

The apparent viscosity measured at shear rate of 50 1/s at 20° C. of all treatments was not significantly different among days over the 14 day shelf life study (P>0.05) (FIG. 18). Corresponding to phase separation results, there was an increase in apparent viscosity of chocolate milks with increasing micellar casein concentration. HPJ-processed chocolate milk samples at 500 MPa containing 4% micellar casein showed significantly higher apparent viscosity (14.0±0.1 mPa s) than all other treatments, including Control+(P<0.05). The apparent viscosity of chocolate milks fortified with 4% micellar casein and processed using HPJ at 500 MPa was well within the range of commercial acceptability, when compared to chocolate milk beverages available in retail stores (Yanes et al., 2002). An increased in apparent viscosity was observed also in untreated samples (no HPJ) with increasing micellar concentration. However, the addition of micellar casein alone was not able to stabilize these chocolate milks and phase separation was observed within one day after preparation.

Figure 19:
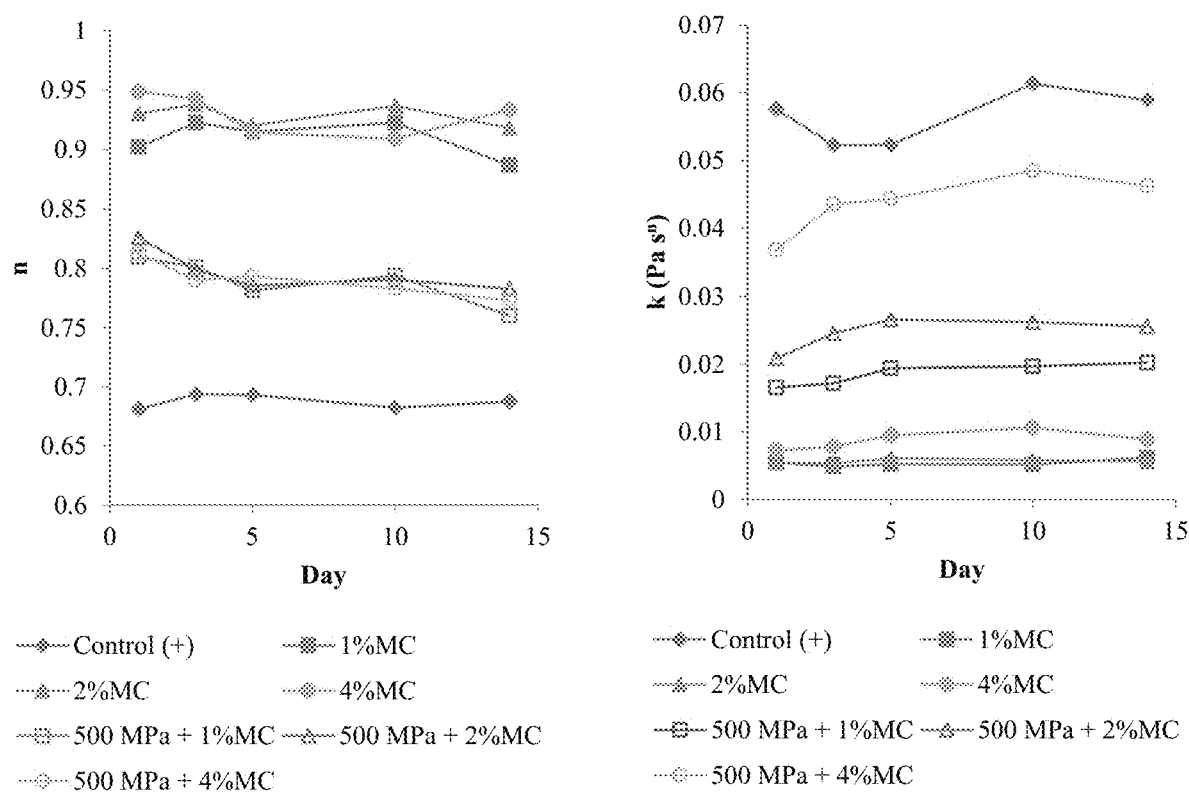

Flow curves for Control+, Chocolate milk containing+ 1%, 2% or 4% w/v micellar casein, and HPJ-processed chocolate skim milk containing+1%, 2%, or 4% micellar casein were fitted to the Power-Law rheological model, and the flow behavior index (n) and consistency index (k) monitored were 14 day shelf-life. Similar to rheological properties of chocolate skim milk samples (Example 1), there were no significant differences between days of each sample for flow behavior index or consistency index. All three samples with 1%, 2%, and 4% micellar casein and processed using HPJ at 500 MPa exhibited shear-thinning behavior over the 14 day shelf-life (FIG. 19). Samples containing micellar casein but not processed using HPJ exhibited Newtonian flow behavior regardless of concentration and were not significantly different from each other (P>0.05). Although chocolate milk with 4% micellar casein and processed using HPJ at 500 MPa exhibited higher apparent viscosity at 50 1/s (n=0.79; k=0.04 mPa s"), Control+samples containing k-carrageenan showed a stronger shear-thinning behavior (n=0.69) and thicker consistency (k=0.06 mPa s") (FIG. 19).

It will be recognized from the foregoing that HPJ processing can be used as an alternative processing method for the stabilization of cocoa particles in k-carrageenan-free chocolate milk. No phase separation was observed in chocolate skim milk formulations with 4% w/v micellar casein and processed using HPJ at 375 and 500 MPa. The ability to achieve a stable cocoa dispersion when processing using HPJ at >300 MPa provides a potential for a commercial additive free chocolate milk application. Little phase separation was also observed in chocolate skim milk formulations processed using HPJ without added micellar casein. The observation of decreased phase separation with increasing pressure and micellar casein suggest the formation of networks between cocoa particles and caseins, with the ability to increase dispersion stability. The denaturation of whey proteins due to high heat processing, the dissociation of casein micelles due to HPJ processing, and the cocoa particle size reduction, probably contributed to the final stability of chocolate milk.

REFERENCES

Afoakwa, E. O. 2016. Industrial chocolate manufacture—processes and factors influencing quality. 2nd ed. John Wiley & Sons, Ltd., West Sussex, UK.

Belitz, H. D., W. Grosch, and P. Schieberle. 2009. Food Chemistry. 4th ed. Springer Berlin Heidelberg, Heidelberg, Germany.

Bixler, H. 1996. Recent developments in manufacturing and marketing carrageenan. Hydrobiologia 326/327:35-57.

van den Boomgaard, T., T. van Vliet, and A.C.M. Hooydonk. 1987. Physical stability of chocolate milk. J Food Sci Technol 22:279-291.

Cohen, S., and N. Ito. 2002. A critical review of the toxicological effects of carrageenan and processed Eucheuma seaweed on the gastrointestinal tract. Crit. Rev. Toxicol. 32:413-444.

Fox, P. F., T. Uniacke-Lowe, P. L. H. McSweeney, and J. A. O'Mahony. 2015. Dairy Chemistry and Biochemistry. 2nd ed. Springer, Switzerland.

Geilinger, I., R. Amado, and H. Neukom. 1981. Isolation and characterization of native starch from cocoa beans. Starke 33:76-79.

Goff, H. D., and R. W. Hartel. 2013. Ice Cream. Seventh ed. Springer, New York.

Harte, F. 2016. Food Processing by High-Pressure Homogenization. V. M. Balasubramaniam, G. V. Barbosa-Canovas, and H. L. M. Lelieveld, ed. Springer.

Harte, F. M., M. C. Martinez, and M. S. Mohan. 2016. Foaming and emulsifying properties of high pressure jet processing pasteurized milk. Penn State Res. Found. U.S. Pat. No. 0,374,359.

Hayes, M. G., P. F. Fox, and A. L. Kelly. 2005. Potential applications of high pressure homogenisation in processing of liquid milk. J. Dairy Res. 72:25-33.

Hayes, M. G., and A. L. Kelly. 2003. High pressure homogenisation of raw whole bovine milk (a) effects on fat globule size and other properties. J. Dairy Res. 70:297-305.

Innova Market Insights. 2015. Clean label enters the US mainstream as manufacturers list ingredients to avoid. Food Beverage Innov. 13:4.

Langendorff, V., G. Cuvelier, C. Michon, B. Launay, A. Parker, and C. G. De Kruif. 2000. Effects of carrageenan type on the behaviour of carrageenan/milk mixtures. Food Hydrocoll. 14:273-280.

Lodaite, K., F. Chevalier, E. Armaforte, and A. L. Kelly. 2009. Effect of high-pressure homogenisation on rheological properties of rennet-induced skim milk and standardised milk gels. J. Dairy Res. 76:294-300.

Minife, B. W. 1989. Cocoa processes. 3rd ed. Van Nostrand Reinhold, New York, N.Y.

Mohan, M. S., R. Ye, and F. Harte. 2016. Initial study on high pressure jet processing using a modified waterjet on physicochemical and rennet coagulation properties of pasteurized skim milk. Int. Dairy J. 55:52-58.

Pereda, J., V. Ferragut, J. M. Quevedo, B. Guamis, and A. J. Trujillo. 2007. Effects of ultra-high pressure homogenization on microbial and physicochemical shelf life of milk. J. Dairy Sci. 90:1081-1093.

Pugnaloni, L. a. 2004. On the relationship between rheology and percolation in the gelation of weakly attractive colloids: Beyond "snapshot" percolation 4.

Roach, A., and F. Harte. 2008. Disruption and sedimentation of casein micelles and casein micelle isolates under high-pressure homogenization. Innov. Food Sci. Emerg. Technol. 9:1-8.

Saha, D., and S. Bhattacharya. 2010. Hydrocolloids as thickening and gelling agents in food: A critical review. J. Food Sci. Technol. 47:587-597.

San Martin-González, M. F., A. Roach, and F. Harte. 2009. Rheological properties of corn oil emulsions stabilized by commercial micellar casein and high pressure homogenization. LWT—Food Sci. Technol. 42:307-311. doi: 10.1016/j.lwt.2008.04.005.

Sandra, S., and D. G. Dalgleish. 2005. Effects of ultra-high-pressure homogenization and heating on structural properties of casein micelles in reconstituted skim milk powder. Int. Dairy J. 15:1095-1104.

Sandra, S., and D. G. Dalgleish. 2007. The effect of ultra high-pressure homogenization (UHPH) on rennet coagulation properties of unheated and heated fresh skimmed milk. Int. Dairy J. 17:1043-1052. doi:10.1016/j.idairyj.2007.01.005.

Shah, Z., and F. Huffman. 2003. Current availability and consumption of carrageenan-containing foods. Ecol. Food Nutr. 42:357-371.

Snoeren, T. H. M., T. A. J. Payens, J. Jeunink, and P. Both. 1975. Electrostatic interaction between k-carrageenan and k-casein. Milchwissenschaft.

Sorensen, H., K. Mortensen, G. H. Sorland, F. H. Larsen, M. Paulsson, and R. Ipsen. 2014. Dynamic ultra-high pressure homogenisation of milk casein concentrates: Influence of casein content. Innov. Food Sci. Emerg. Technol. 26:143-152.

Steffe, J. F. 1996. Rheological Methods in Food Process Engineering. 2nd editio. Freeman Press, East Lansing, Mich.

Thiebaud, M., E. Dumay, L. Picart, J. P. Guiraud, and J. C. Cheftel. 2003. High-pressure homogenisation of raw bovine milk. Effects on fat globule size distribution and microbial inactivation. Int. Dairy J. 13:427-439.

Tobin, J., S. P. Heffernan, D. M. Mulvihill, T. Huppertz, and A. L. Kelly. 2015. Applications of high-pressure homogenization and microfluidization for milk and dairy products. Emerg. Dairy Process. Technol. Oppor. Dairy Ind. 93-114.

USDA-NOSB. 2016a. NOSB Meeting November 2016. Accessed. https://www.ams.usda.gov/sites/default/files/media/NOPTranscriptsStLouisNov2016.pdf.

USDA-NOSB. 2016b. NOSB Fall 2016 Proposals. Accessed. https://www.ams.usda.gov/sites/default/files/media/Voting sheet_COI-DOI final November 2016_webpost.pdf.

Walstra, P. 2003. Dispersed systems. P. Walstra, ed. Marcel Dekker, New York, N.Y.

Walstra, P., J. T. M. Wouters, and T. J. Geurts. 2006. Dairy Science and Technology. 2nd ed. CRC/Taylor & Francis, Boca Raton.

Yanes, M., L. Durán, and E. Costell. 2002. Rheological and optical properties of commercial chocolate milk beverages. J. Food Eng. 51:229-234.

While the disclosure has been particularly shown and described with reference to specific embodiments (some of which are preferred embodiments), it should be understood by those having skill in the art that various changes in form and detail may be made therein without departing from the spirit and scope of the present disclosure as disclosed herein.

What is claimed is:

1. A method for preparing shelf stable k-carrageenan free chocolate milk, the method comprising mixing cocoa powder, sugar, milk, and micellar casein to obtain a mixture thereof, optionally heating and conventionally homogenizing the mixture, and subsequently subjecting the mixture to High Pressure Jet Processing (HPJ) wherein the HPJ comprises a hydrostatic pressure of at least 300 MPa, thereby producing the shelf stable k-carrageenan free chocolate milk that exhibits no visually detectable phase separation for at least 7 days.

2. The method of claim 1, wherein the hydrostatic pressure comprises between 300 MPa and 700 MPa.

3. The method of claim 1, wherein the micellar casein is added such that it is from 1-10% w/v of the shelf stable k-carrageenan free chocolate milk.

4. The method of claim 1, comprising holding the shelf stable k-carrageenan free chocolate at refrigerated temperature for at least 7 days, and wherein the shelf stable k-carrageenan free chocolate does not undergo visually detectable phase separation for at least 7 days.

5. The method of claim 4, comprising holding the shelf stable k-carrageenan free chocolate at refrigerated temperature for at least 14 days, and wherein the shelf stable k-carrageenan free chocolate does not undergo visually detectable phase separation for at least 14 days.

6. The method of claim 4, wherein the visually detectable phase separation is determined using the formula:

$$\text{Phase separation (\%)} = \left(1 - \frac{\text{Height of bottom phase (cm)}}{\text{Height of chocolate milk volume in bottle (cm)}}\right) \times 100.$$

7. The method of claim 5, wherein the visually detectable phase separation is determined using the formula:

$$\text{Phase separation (\%)} = \left(1 - \frac{\text{Height of bottom phase (cm)}}{\text{Height of chocolate milk volume in bottle (cm)}}\right) \times 100.$$

\* \* \* \* \*